(12) United States Patent
Osawa et al.

(10) Patent No.: US 10,192,360 B2
(45) Date of Patent: Jan. 29, 2019

(54) INFORMATION PROCESSING APPARATUS AND INFORMATION PROCESSING METHOD

(71) Applicant: Sony Interactive Entertainment Inc., Tokyo (JP)

(72) Inventors: Hiroshi Osawa, Kanagawa (JP); Naoki Numaguchi, Tokyo (JP); Shinichi Hirata, Kanagawa (JP); Keiji Togawa, Tokyo (JP); Takeshi Yamagishi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 123 days.

(21) Appl. No.: 15/116,027

(22) PCT Filed: Feb. 13, 2015

(86) PCT No.: PCT/JP2015/053995
§ 371 (c)(1),
(2) Date: Aug. 2, 2016

(87) PCT Pub. No.: WO2015/125709
PCT Pub. Date: Aug. 27, 2015

(65) Prior Publication Data
US 2017/0182412 A1 Jun. 29, 2017

(30) Foreign Application Priority Data
Feb. 20, 2014 (JP) .................................. 2014-030929

(51) Int. Cl.
*G06T 19/00* (2011.01)
*A63F 13/213* (2014.01)
(Continued)

(52) U.S. Cl.
CPC .......... *G06T 19/006* (2013.01); *A63F 13/213* (2014.09); *A63F 13/525* (2014.09);
(Continued)

(58) Field of Classification Search
CPC ......... G06T 17/70; G06T 19/00; G06T 13/40; G06F 3/011; A63F 13/214; A63F 13/525; A63F 13/5258; A63F 13/65
See application file for complete search history.

(56) References Cited

U.S. PATENT DOCUMENTS 6,430,997 B1 8/2002 French
6,853,935 B2 2/2005 Sato
(Continued)

FOREIGN PATENT DOCUMENTS

EP 1396781 A2 3/2004
JP 8190640 A 7/1996
(Continued)

OTHER PUBLICATIONS

European Search Report for corresponding EP Application No. EP 15752128, 16 pages, dated Oct. 19, 2017.
(Continued)

*Primary Examiner* — Michelle L Sams
(74) *Attorney, Agent, or Firm* — Matthew B. Dernier, Esq.

(57) ABSTRACT

By extracting figures of a play field and a display apparatus from a taken image, the positional coordinates of the play field and a screen in a world coordinate system are obtained. Next, a virtual world is built such that the ground of the virtual world is positioned continually flush with the surface of the play field in a real world, on the opposite side of the real world with the screen in between in a virtual space defined in the world coordinate system. Then, a virtual viewpoint is placed at a position corresponding to the viewpoint of a user in a real space so as to generate an image with the virtual world projected to the screen on the basis of this virtual viewpoint as a display image.

10 Claims, 14 Drawing Sheets

(51) Int. Cl.
*A63F 13/5258* (2014.01)
*G06F 3/01* (2006.01)
*A63F 13/525* (2014.01)
*G06T 13/40* (2011.01)
*A63F 13/42* (2014.01)
*A63F 13/98* (2014.01)

(52) U.S. Cl.
CPC .......... *A63F 13/5258* (2014.09); *G06F 3/011* (2013.01); *A63F 13/42* (2014.09); *A63F 13/98* (2014.09); *G06T 13/40* (2013.01)

(56) References Cited

U.S. PATENT DOCUMENTS

| | | | |
|---|---|---|---|
| 8,350,896 B2 | 1/2013 | Kawakami | |
| 8,466,894 B2 | 6/2013 | Sugita | |
| 2002/0095265 A1 | 7/2002 | Sato | |
| 2009/0202975 A1* | 8/2009 | Bolick | G09B 25/02 434/401 |
| 2010/0123772 A1 | 5/2010 | Kawakami | |
| 2012/0026108 A1 | 2/2012 | Sugita | |
| 2012/0069051 A1* | 3/2012 | Hagbi | G06T 19/006 345/633 |
| 2012/0223885 A1 | 9/2012 | Perez | |
| 2014/0015813 A1 | 1/2014 | Numaguchi | |

FOREIGN PATENT DOCUMENTS

| | | |
|---|---|---|
| JP | 2000276613 A | 10/2000 |
| JP | 2002229730 A | 8/2002 |
| JP | 2008073256 A | 4/2008 |
| JP | 2010122879 A | 6/2010 |
| JP | 2011248655 A | 12/2011 |
| JP | 2012033043 A | 2/2012 |
| WO | 2007050885 A2 | 5/2007 |

OTHER PUBLICATIONS

Hrvoje Benko et al: "MirageTable", Proceedings of the 2012 ACM Annual Conference on Human Factors in Computing Systems, CHI Letters vol. 12, 10 pages (Jan. 1, 2012).

David Anderson et al: "Building virtual structures with physical blocks", User Interface Software and Technology, ACM, 2 Penn Plaza, Suite 701 New York NY 10121-0701 USA, CHI Letters, vol. 1, 1, pp. 71-72,(Nov. 7, 1999).

International Preliminary Report on Patent Ability and Written Opinion for corresponding PCT Application No. PCT/JP2015/053995, 12 pages, dated Sep. 1, 2016.

Interantional Search Report for corresponding PCT Application No. PCT/JP2015/053995, 4 pages, dated Apr. 21, 2015.

Michael Philetus Weller, Ellen Yi-Luen Do, Mark D Gross, "Posey: Instrumenting a Poseable Hub and Strut Construction Toy" Proceedings of the Second International Conference on Tangible and Embedded Interaction, pp. 1-8 (Jan. 2008).

* cited by examiner

| IDENTIFICATION No. | SHAPE | SIZE | JOINT POSITION |
|---|---|---|---|
| 1 | QUADRATIC PRISM | 4×4×8 | J1(1,2,2)<br>J2(2,1,2)<br>J3(2,4,2)<br>J4(2,7,2)<br>...... |
| 2 | QUADRATIC PRISM | 3×4×6 | J1(1,1.5,1.5)<br>J2(2,1,1.5)<br>J3(2,3,1.5)<br>.... |
| 3 | CUBE | 4×4×4 | J1(1,2,2)<br>J2(2,2,2)<br>.... |
| .... | .... | .... | .... |

160

INFORMATION PROCESSING APPARATUS AND INFORMATION PROCESSING METHOD

TECHNICAL FIELD

The present invention relates to an information processing apparatus and an information processing method that are configured to display images by use of real bodies in the real world.

BACKGROUND ART

Recently, technologies in which parameters related with such bodies in a real space as humans and things are measured by some means and the results thereof are captured as an input value in a computer for analysis and displayed as images are used in a variety of fields. In the field of computer games, intuitive and easy operations have been realized by acquiring the movements of a user himself or herself and the marker held by the user and accordingly moving characters in a virtual world inside a display screen (refer to PTL 1 for example). The technologies for reflecting the movement and shape change of a body in a real space onto a display image are expected for the application not only to games but also to toys and learning tools (refer to NPL 1 and PTL 2 for example).

CITATION LIST

Patent Literatures

[PTL 1] WO 2007/050885 A2, [PTL 2] JP 2008-73256 A

Non Patent Literature

[NPL 1] Posey: Instrumenting a Poseable Hub and Strut Construction Toy, Michael Philetus Weller, Ellen Yi-Luen Do, Mark D Gross, Proceedings of the Second International Conference on Tangible and Embedded Interaction, 2008, pp. 39-46

SUMMARY

Technical Problems

The above-mentioned conventional technologies are basically presumes comparatively simple image display such as displaying a body in a real space with the shape thereof unchanged and displaying an image obtained by replacing a part of a body by an object drawn by computer graphics. However, as the performance of processing bodies themselves and the technologies of recognizing bodies in an information processing apparatus advance in the future, there would occur a big problem how to express the further fusion with a real space and the enhanced presence by use of obtained information. In addition, in the case of similar processing systems, it is desirable to realize display modes matching the needs as occasion may demand.

The present invention has been made in consideration of the problems mentioned above and intended to provide a technology that can realize a various kinds of image expression by use of the information associated with bodies in the real world.

Solution to Problems

In carrying out the invention and according to one aspect thereof, there is provided an information processing apparatus. This information processing apparatus has a real space analysis unit configured to sequentially identify, from an image taken by a camera, a positional relation between a display apparatus, a surface in front of a screen of the display apparatus on the surface of which a body to be handled by a user is placed, and the user; an information processing unit configured to arrange a predetermined object in a virtual space built on the basis of the positional relation between the display apparatus and the surface and set a virtual viewpoint for the object by changing the virtual viewpoint in accordance with a movement of the user; and a display image generation unit configured to generate a display image by drawing an object seen from the virtual viewpoint and output the generated display image to the display apparatus.

In carrying out the invention and according to another aspect thereof, there is provided an information processing method. This information processing method has a step of acquiring a taken image from a camera; a step of sequentially identifying, from the taken image, a positional relation between a display apparatus, a surface in front of a screen of the display apparatus on the surface of which a body to be handled by a user is placed, and the user; a step of arranging a predetermined object in a virtual space built on the basis of the positional relation between the display apparatus and the surface in accordance with rules read from a memory and setting a virtual viewpoint for the object by changing the virtual viewpoint in accordance with a movement of the user; and a step of generating a display image by drawing an object seen from the virtual viewpoint and outputting the generated display image to the display apparatus.

It should be noted that any combinations of above-mentioned components and the expressions of the present invention as converted between the methods, apparatuses, systems, recording media, and computer programs are also valid as the modes of the present invention.

Advantageous Effect of Invention

According to the present invention, various images that reflect states of bodies to be handled by a user in the real world can be displayed.

DESCRIPTION OF EMBODIMENT

Figure 1:
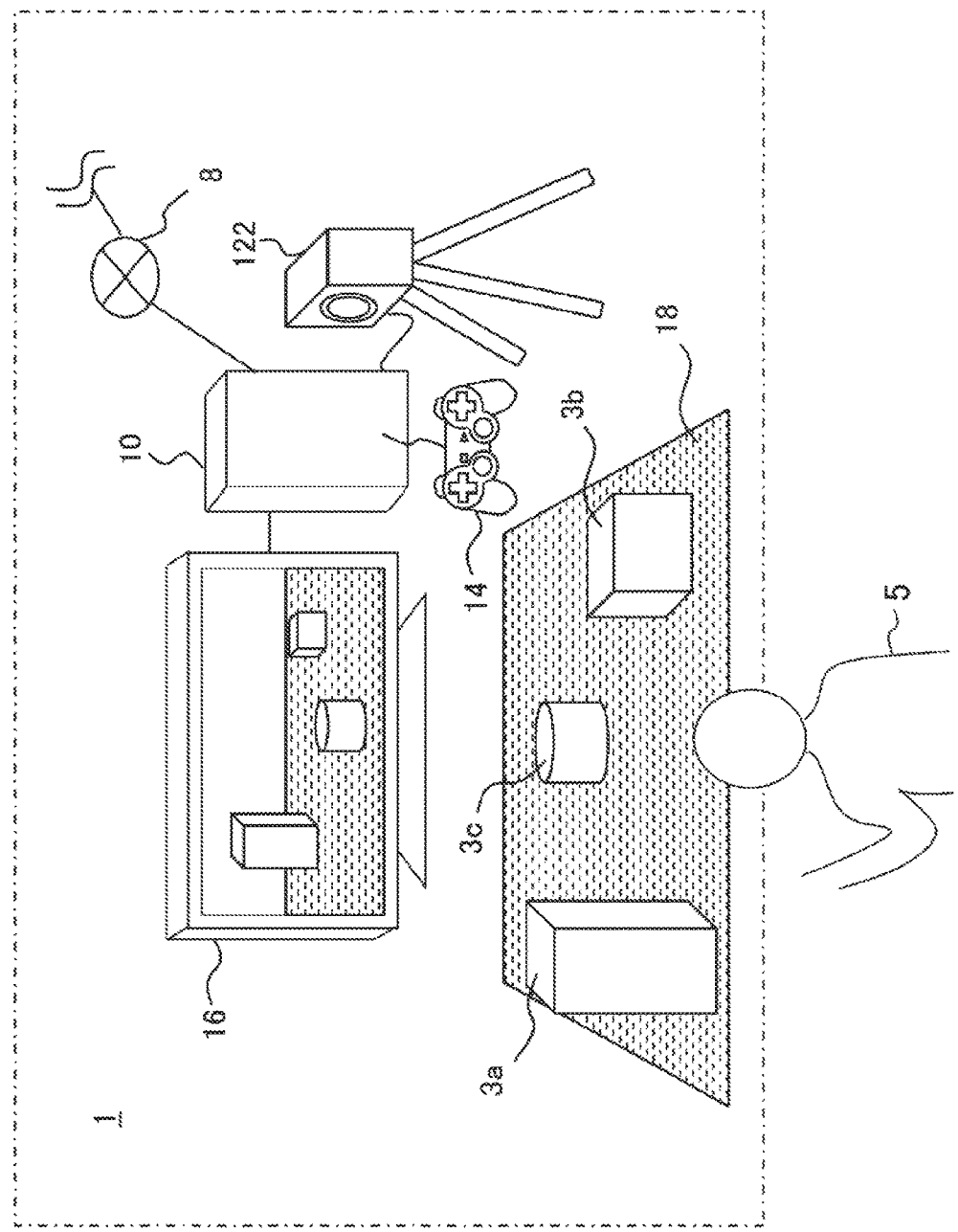
FIG. 1 is a diagram illustrating one example of a configuration of an information processing system to which the present embodiment is applicable.

Now, referring to FIG. 1, there is shown one example of a configuration of an information processing system to which the present embodiment is applicable. An information processing system 1 has blocks 3a, 3b, and 3c that can be moved and assembled by a user 5 in the real world, an information processing apparatus 10 for executing information processing according to states and so on of the blocks 3a, 3b, and 3c, an input apparatus 14 for accepting a user operation that is entered in the information processing apparatus 10, and a display apparatus 16 to which processing results from the information processing apparatus 10 are outputted. The information processing system 1 further has a play field 18 providing a surface on which the blocks 3a, 3b, and 3c are arranged and a camera 122 for taking images of a real space that includes the blocks 3a, 3b, and 3c.

The information processing apparatus 10 may be a game apparatus or a personal computer, for example, or may realize information processing functions thereof by loading necessary application programs. The information processing apparatus 10 may establish communication with another information processing apparatus or a server via a network 8 so as to transmit and receive necessary information as needed. The display apparatus 16 may be a general-purpose display such as a liquid crystal display, a plasma display, or an organic EL (Electroluminescence) display. The display apparatus 16 may also be a television receiver that has a display mentioned above and a speaker. The camera 122 is a digital video camera having an imaging element such as CCD (Charge Coupled Device) or CMOS (Complementary Metal Oxide Semiconductor), taking a moving image of a space at least including the play field 18 and the blocks 3a, 3b, and 3c arranged thereon.

The input apparatus 14 may be any one of a general-purpose input apparatus such as a game controller, a keyboard, a mouse, a joy stick, and a touch pad arranged on the screen of the display apparatus 16 or a combination thereof. The play field 18 makes up a surface on which the blocks 3a, 3b, and 3c are arranged and may be any of a plate, a cloth, and a desk top plate. The blocks 3a, 3b, and 3c may each be a thing of a simple shape such as a rectangular parallelepiped or a cylinder or a thing of a more complicated shape such a miniature or a part thereof of a thing found in the real world as a doll or a miniature car or chessmen of a game. It should be noted that there is no restriction on the size, the material, the color, and the number of the blocks 3a, 3b, and 3c. Further, each of the blocks 3a, 3b, and 3c may be of a structure that is assembled by a user or a thing completed beforehand.

The information processing apparatus 10 analyzes an image taken by the camera 122 so as to get a positional relation between the user 5, the play field 18, and the screen of the display apparatus 16. Next, the configuration of a display image is determined on the basis of the positional relation between at least two of the above-mentioned three items. In FIG. 1, the camera 122 is arranged in only one unit such that the play field 18 is viewed from the right side as seen from the user 5 opposed to the display apparatus 16 with the play field 18 therebetween; however, the present embodiment is not limited to this configuration.

To be more specific, if an image that allows the acquisition of the positional relation between the display apparatus 16, the play field 18, and the user 5 through image analysis is taken, the camera 122 is not restricted in the arrangement or the number of units. For example, placing the camera 122 at a position from which all of the display apparatus 16, the play field 18, and the user 5 are can be viewed allows the camera 122 to get the positional relation from the figures among the taken images. Alternatively, the camera 122 may be arranged above or below the display apparatus 16 such that the sensor surface of the camera 122 is positioned approximately flush with the screen of the display apparatus 16. In this case, the display apparatus 16 does not get in the field of vision of the camera 122, but regarding the plane of the taken image to be a screen allows the acquisition of the positional relation between the above-mentioned three items. Mounting the camera 122 on such a part of the body of the user 5 as the head also allows the acquisition of the positional relation between the three items in the like manner.

In addition, two or more cameras 122 may be arranged so as to take images in two or more directions. This arrangement allows the integration of the positional information obtained from each taken image in order to get the positional relation between the three items if arrangement is made such that the display apparatus 16, the play field 18, and the user 5 are found in the taken image of any one of cameras. It is also practicable to mount one of two or more cameras above or below the display apparatus 16 as described above or onto the body of the user 5. In an environment where the user 5 swings greatly, as the number of cameras increases, the possibility of occurrence of occlusion is lowered, so that the accuracy of acquiring positional relation can easily be maintained.

It should be noted that the camera 122 or one of two or more cameras 122 may be configured as a stereo camera so as to get the position of a subject in the depth direction, thereby acquiring a positional relation more strictly. A technology in which the parallax in an image taken by the stereo camera from left and right viewpoints is used to get the position of a subject in the three-dimensional space on the basis of the principle of triangulation is widely known. Alternatively, depth and three-dimensional information acquisition means other than binocular stereoscopic vision may be used. For example, a viewpoint moving camera may be used or the position may be identified by the technique of TOF (Time Of Flight) by use of an infrared radiation mechanism and an infrared beam sensor for sensing the reflected light thereof.

The information processing apparatus 10 may be connected to the camera 122 or the display apparatus 16 in a wired or wireless manner and through a variety of networks. Alternatively, any two or all of the camera 122, the information processing apparatus 10, and the display apparatus 16 may be combined to be integrally equipped. It is also practicable to arrange a communication mechanism inside the blocks 3a, 3b, and 3c so as to provide wireless communication with the information processing apparatus 10 by use of Bluetooth (trademark) protocol or IEEE (Institute of Electrical and Electronic Engineers) 802.11 protocol. Alternatively, the blocks 3a, 3b, and 3c may be connected with the information processing apparatus 10 by a cable.

In the example shown in FIG. 1, an image as if the blocks 3a, 3b, and 3c on the play field 18 are reflected in a mirror, so to speak, is displayed on the display apparatus 16. In a general technology, an image in which the play field 18 is taken with the camera 122 mounted on the display apparatus 16 may be horizontally flipped to provide the image shown. On the other hand, in the present embodiment, objects representative of the blocks 3a, 3b, and 3c are arranged in a virtual space simulating a real space on the basis of a positional relation between the play field 18 and the display apparatus 16. Then, a virtual viewpoint or a plane of projection to the arranged objects are appropriately set on the basis of the positions of the user 5 and the display apparatus 16, thereby drawing a display image. Further, a virtual world that does not exist in the real world is also built in the virtual space concerned and the virtual world thus built is drawn.

Figure 2:
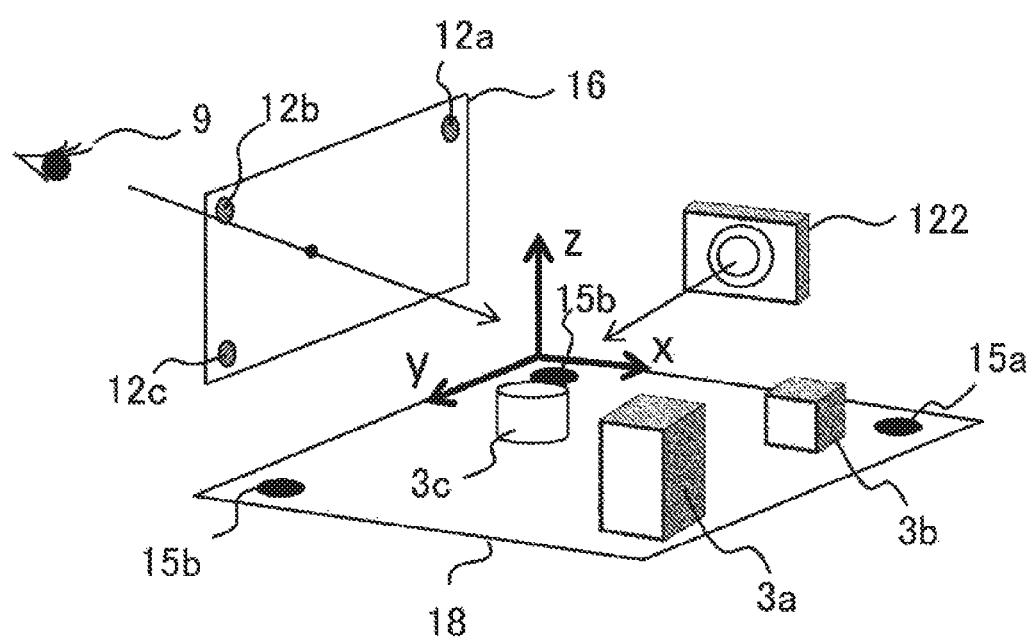
FIG. 2 is a diagram for explaining one example of a virtual space to be built in the mode shown in FIG. 1.

Referring to FIG. 2, there is shown a diagram for explaining one example of a virtual space that is built in the mode shown in FIG. 1. First, a taken image includes the images of the play field 18 and the display apparatus 16 as viewed from the viewpoint of the camera 122. These images are extracted so as to be fit in the world coordinate system of a virtual space appropriately set on the basis of the contour shapes of these images, thereby setting the surface and the area on which the blocks are arranged and the surface and the area of the display screen. In the diagram, with the apex of the play field 18 located in the front right side as viewed from the camera 122 set as the origin, a world coordinate system with the surface of the play field 18 being an xy surface and the vertical direction of the screen of the display apparatus 16 being a z-axis is set. However, coordinate systems are not limited to this world coordinate system.

In order to detect with high precision the figures of the play field 18 and the display apparatus 16 from a taken image, markers for detection may be attached to the particular positions of these figures. In the example shown in FIG. 2, markers 15a, 15b, and 15c are attached to the three of the four corners of a rectangle forming the play field 18 and markers 12a, 12b, and 12c are shown in the three of the four corners of the screen of the display apparatus 16. The markers 15a, 15b, and 15c of the play field 18 may be printed or attached if the play field 18 is a cloth or plate or, if the play field 18 is a desk top plate, cards may be placed on predetermined positions of the top plate.

The markers 12a, 12b, and 12c of the display apparatus 16 may be included in a display image or attached to the frames or the like of the display apparatus 16. The markers may be graphics, patterns, or marks of predetermined shape and color or two-dimensional barcodes. Detection of the figures of these markers from a taken image allows easy identification of the area of the play field 18 and the area of the screen of the display apparatus 16. It should be noted that, instead of attaching markers to partial positions, the whole play field 18 may be colored or patterned in predetermined manners that are different from those of the periphery or the difference between the brightness values of the screen of the display apparatus 16 and the periphery may be used.

After setting each surface in a virtual space as described above, objects representative of the blocks are arranged on the play field in the virtual space on the basis of the positional relation between the figure of the play field 18 and the figures of the blocks 3a, 3b, and 3c. For example, on the basis of the shape of the figure in a taken image, search can be executed for the information related with the shape of the block registered in advance, thereby identifying the correct shape of the block placed at each position and an object model representative thereof. It is also practicable to provide communication functions on the block so as to more correctly identify a corresponding object model on the basis of the identification information and the like transmitted from each block.

The information transmitted from the block may include not only the identification information of the block but also the relation of interconnection of blocks, the position measured by the block itself, and physical quantities such as tilt angles. In this case, the information obtained from the figure of a taken image may be integrated with the information transmitted from the block, thereby identifying a block state in more detail. It should be noted however that, if no block state detail is required in a mode in which the object representative of a block is not included in a display image, for example, the processing may be skipped appropriately.

When a virtual space configured by the play field 18, the display apparatus 16, and the blocks 3a, 3b, and 3c has been generated, a virtual viewpoint is set at a predetermined position and the images of the blocks 3a, 3b, and 3c seen from this viewpoint are projected to predetermined surfaces, thereby drawing a display image. In the example shown in FIG. 1, a virtual viewpoint 9 is placed behind the screen of the display apparatus 16 and an object on the line of sight over the play field 18 is projected onto the screen of the display apparatus 16 or a surface parallel thereto, thereby obtaining the images of the blocks 3a, 3b, and 3c as viewed from the side of the display apparatus 16. Next, by horizontally flipping these images, a mirror image as shown in FIG. 1 is obtained. It should be noted that further changing virtual viewpoints in accordance with user positions gives more presence to the virtual world represented by the display image as described later.

Figure 3:
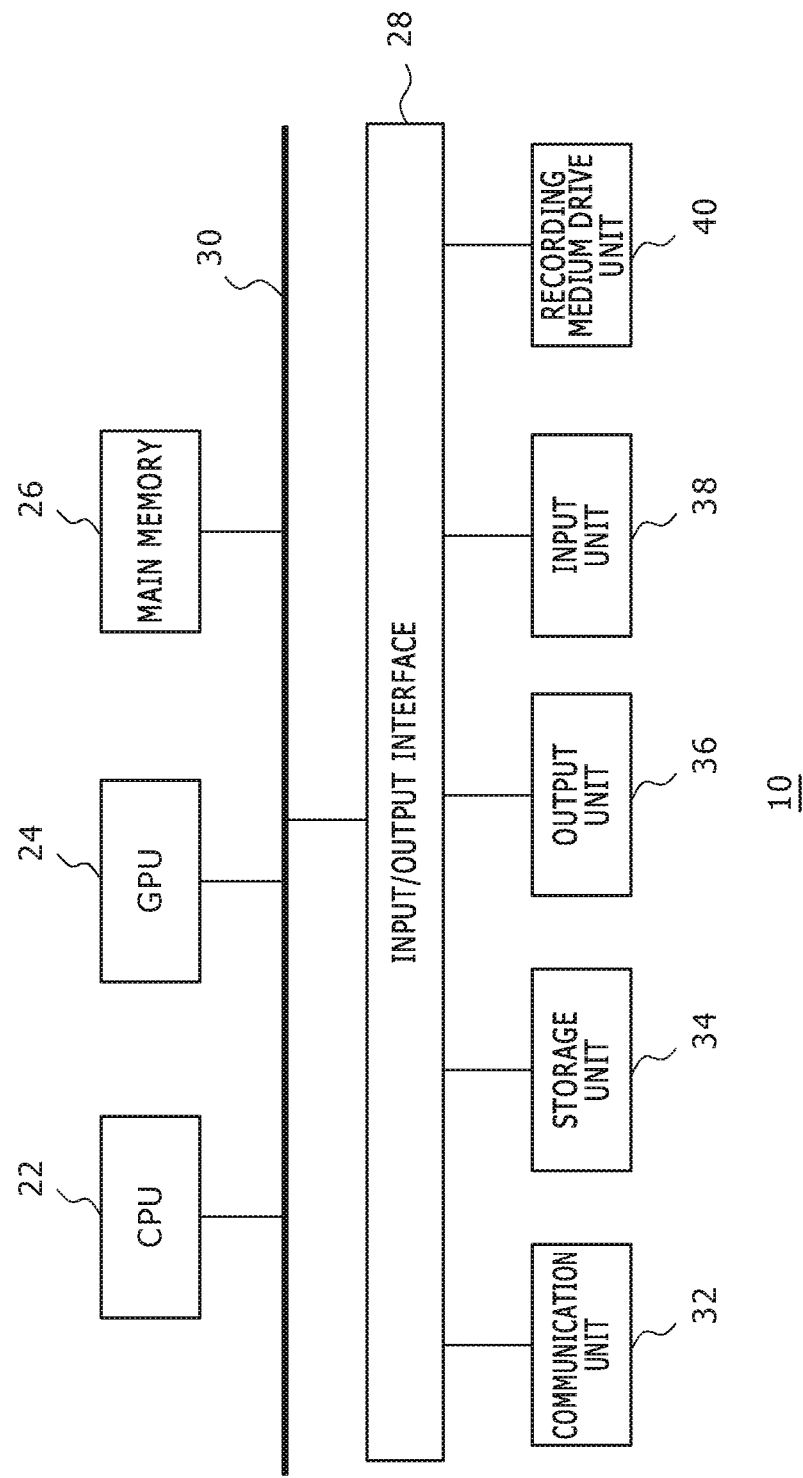
FIG. 3 is a diagram illustrating an internal circuit configuration of an information processing apparatus in the present embodiment.

Referring to FIG. 3, there is shown an internal circuit configuration of the information processing apparatus 10. The information processing apparatus 10 includes a CPU (Central Processing Unit) 22, a GPU (Graphics Processing Unit) 24, and a main memory 26. The CPU 22 controls the processing in the components inside the information processing apparatus 10 and signal transmission on the basis of the operating system and programs such as applications. The GPU 24 executes image processing. The main memory 26, made up of a RAM (Random Access Memory), stores programs and data that are necessary for executing processing.

The above-mentioned components are interconnected via a bus 30. To the bus 30, an input/output interface 28 is further connected. The input/output interface 28 is connected with a peripheral device interface such as USB (Universal Serial Bus) and IEEE1394, a communication unit 32 made up of wired or wireless LAN (Local Area Network) network interface, a storage unit 34 such as a hard disk drive or a non-volatile memory, an output unit 36 for outputting data to an output apparatus such as the display apparatus 16 and a speaker, an input unit 38 through which data is entered from the camera 122 and the input apparatus 14, and a recording medium drive unit 40 for driving a removable recording medium such as an optical disk or a semiconductor memory.

The CPU 22 executes the operating system stored in the storage unit 34 to control all of the information processing apparatus 10. The CPU 22 also executes various programs read from a removable recording medium and loaded in the main memory 26 or downloaded through the communication unit 32. The GPU 24 has a geometry engine function and a rendering processor function and executes drawing processing in accordance with drawing instructions issued from the CPU 22, thereby storing a resultant display image into a frame buffer not shown. Then, the GPU 24 converts the display image stored in the frame buffer into a video signal and outputs the video signal to the output unit 36 or the like.

Figure 4:
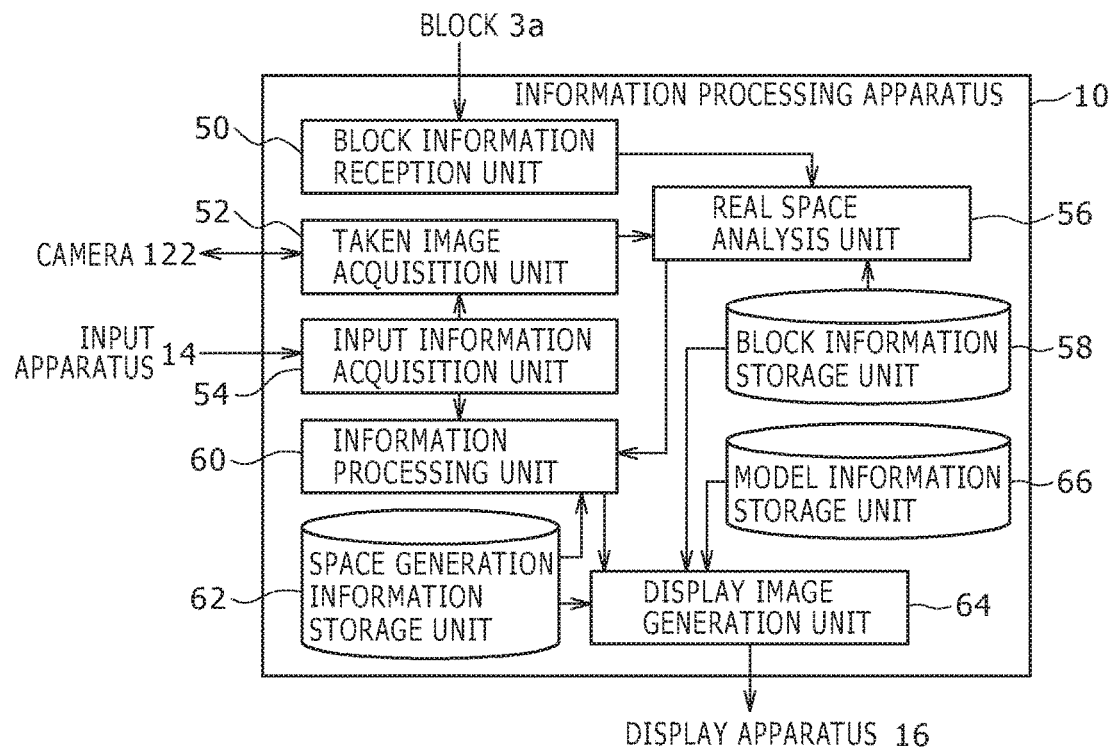
FIG. 4 is a diagram illustrating a configuration of functional blocks of the information processing apparatus in the present embodiment.

Referring to FIG. 4, there is shown a configuration of the functional blocks of the information processing apparatus 10. The functional blocks shown in FIG. 4 and FIG. 7 to be described later can be realized by the CPU 22, the GPU 24, and the main memory 26 shown in FIG. 3 and various mechanisms shown in FIG. 6 in the hardware approach and by the programs loaded from the storage unit 34 and a recording medium into the main memory 26 via the recording medium drive unit 40 and programs stored in a microcomputer in the software approach. Therefore, it can be understood by those skilled in the art that the above-mentioned functional blocks can be realized only by hardware, only by software, or by various combinations thereof and therefore are not restricted to only one of these configurations.

The information processing apparatus 10 has a block information reception unit 50 for receiving information related with blocks from the block 3a and the like, a taken image acquisition unit 52 for acquiring data of a taken image from the camera 122, an input information acquisition unit 54 for acquiring information related with a user operation accepted by the input apparatus 14, a real space analysis unit 56 for acquiring positional relations between things and a user in a real space on the basis of the information and the taken image transmitted from the block 3a, an information processing unit 60 for building a virtual space and executing necessary information processing, and a display image generation unit 64 for generating an image representative of results of the information processing. The information processing apparatus 10 further has a block information storage unit 58 in which registration information related with blocks is stored, a space generation information storage unit 62 specifying construction rules for virtual spaces in accordance with the contents of the processing executed by the information processing unit 60, and a model information storage unit 66 in which data of object models to be arranged in a virtual space is stored.

The block information reception unit 50, realized by the CPU 22, communication unit 32, and so on shown in FIG. 3, establishes communication with the block 3a and so on, thereby receiving block identification information and the information related with block connection relation. The information related with block connection relation is information indicative of which of two or more connected blocks is connected to which of the positions. Although a specified example will be described later, building a configuration in which the blocks are mutually communicable via the joint positions allows, when another block is connected, the recognition, at the block of the destination of connection, of the identification information of this block and the identification information of the joint position. Pieces of such information as above are collected on one block and transmitted so as to make the information processing apparatus 10 sequentially recognize the connection states of a block set even if this block set is in the process of assembly.

The shape and size of each block, a position at which another block is connectable, and identification information thereof are stored in the block information storage unit 58 in advance by relating these pieces of information with block identification information. This allows identification of how blocks of particular shapes are connected and an overall shape of an assembled block set. In addition, various sensors such as an acceleration sensor may be built in a particular block in advance and included in transmission information to be transmitted to the information processing apparatus 10, thereby allowing the recognition of the tilt and the posture of the block set. It should be noted however that the block information reception unit 50 may not operate if the block has no communication mechanism, the shape of the block can be identified only by the figure in a taken image, or the information processing that does not require a detail shape of the block is executed.

The taken image acquisition unit 52, realized by the CPU 22, the communication unit 32, and so on shown in FIG. 3, transmits a signal for requesting the camera 122 for the start of imaging and, at the same time, acquires, at a predetermined rate, the frame data of a moving image obtained by the imaging. The predetermined rate may be the frame rate of a moving image taken by the camera 122 or a rate smaller than this frame rate. The real space analysis unit 56, realized by the CPU 22, the main memory 26, and so on shown in FIG. 3, extracts figures such as the user 5, the play field 18, the display apparatus 16, and the block 3a from a taken image acquired by the taken image acquisition unit 52, thereby getting the positional relations between these figures.

The positions of the block 3a and other blocks on the play field 18 may be identified on the basis of the each figure in a taken image or the information from the blocks received by the block information reception unit 50. In the latter case, if the figure of one block can be extracted in a taken image, the shapes, positions, and postures of all blocks communicable therebetween can be identified by following the connection relation with that one block being the origin. Consequently, the blocks located in the dead angle from the camera 122 can also be identified. It is also practicable to arrange a position sensor on a block itself so as to identify the position of that block without using the figure of a taken image. The identified positional information is transmitted to the information processing unit 60.

The input information acquisition unit 54, realized by the input unit 38 and so on shown in FIG. 3, supplies the contents of an operation executed by the user through the input apparatus 14 to the information processing unit 60. This operation includes a request for start and end of the processing such as a game and a command input for this processing. The processing start and end requests are also transmitted to the taken image acquisition unit 52 so as to be reflected on the start and end of the imaging by the camera 122.

The information processing unit 60, realized by the CPU 22, the GPU 24, the main memory 26 and so on shown in FIG. 3, executes various kinds of information processing such as a game requested by the user through the input apparatus 14. In the present embodiment, games played in a state where the real world is connected to a displayed virtual world, the display of block states, and the information display that supports assembly are mainly described. It is understood by those skilled in the art that the similar display modes are applicable to various representations and fields and therefore the processing by the information processing unit 60 is not restricted. Anyhow, the information processing unit 60 builds a virtual space by use of the positional information of things and the user in a real space identified by the real space analysis unit 56 and then sets virtual viewpoint for the virtual space, thereby realizing the image representation according to the contents of the processing. How to build a virtual space according to the contents of processing and how to set a virtual viewpoint are determined by referencing the space generation information storage unit 62.

The display image generation unit 64, realized by the GPU 24, the main memory 26 and so on shown in FIG. 3, generates a display image in accordance with a request from the information processing unit 60. As described above with reference to FIG. 1 and FIG. 2, in the case of drawing an object model representative of a block as a display image, the model data of each block stored in the block information storage unit 58 in advance is used. In the case where a block is drawn by replacing it with another object such as a character related with that block and a virtual world is expressed as an environment around the block, the model data of each block is stored in the model information storage unit 66 in advance.

The display image generation unit 64 suitably makes a display image be interlocked by moving a virtual viewpoint with respect to a virtual space in accordance with the movement of the user. Consequently, the feeling that the user looks at a deep space through the screen of the display apparatus 16 as a window and the feeling that the user looks into an actual mirror can be provided, thereby providing the staging of the image display fused with the real space around the display apparatus 16. The generated display image is outputted to the display apparatus 16 at a predetermined rate so as to be displayed on the display apparatus 16 as a moving image.

Figure 5:
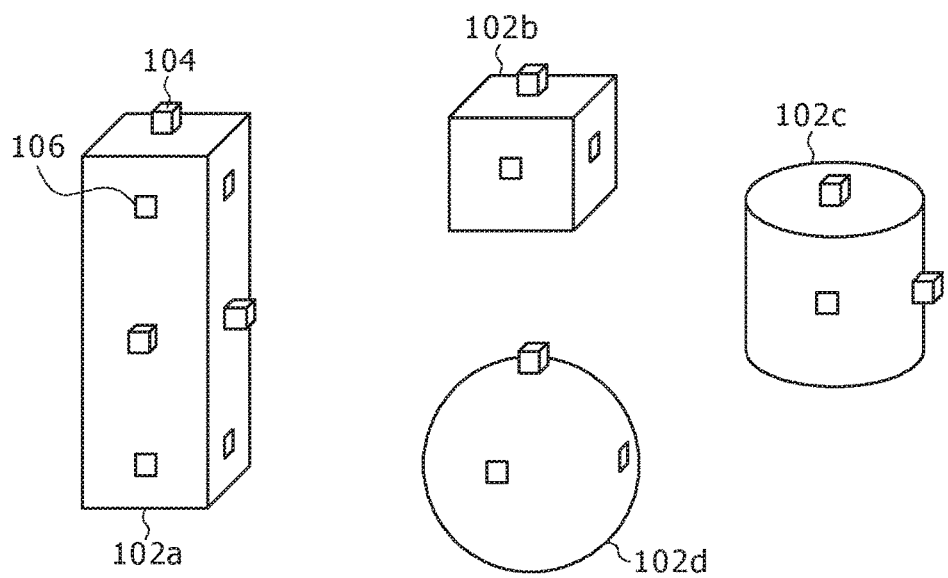
FIG. 5 is a diagram illustrating one example of an external view of a block in the present embodiment.

The following describes a structure of a block in a mode where a communication mechanism is arranged with the block being communicable. Referring to FIG. 5, there is shown an example of an external view of blocks in the present embodiment. The blocks may have various shapes such as a quadratic prism block 102a, a cubic block 102b, a cylindrical block 102d, and a spherical block 102c. It should be noted that the shapes of blocks are not restricted to those shown mentioned above. In addition, two or more shapes may not always be included. In the diagram, one block is shown for one shape; however, the number of blocks is not restricted as a matter of course. Each block is arranged with a projecting part 104 and a recessing part 106 of the predetermined size and shape and the projecting part 104 is inserted in the recessing part 106, thereby providing a configuration in which the blocks are connectable to each other at a desired position. In addition, making the tilt angle and rotary angle at the connected position variable allows the block set after connection to be deformed.

Figure 6:
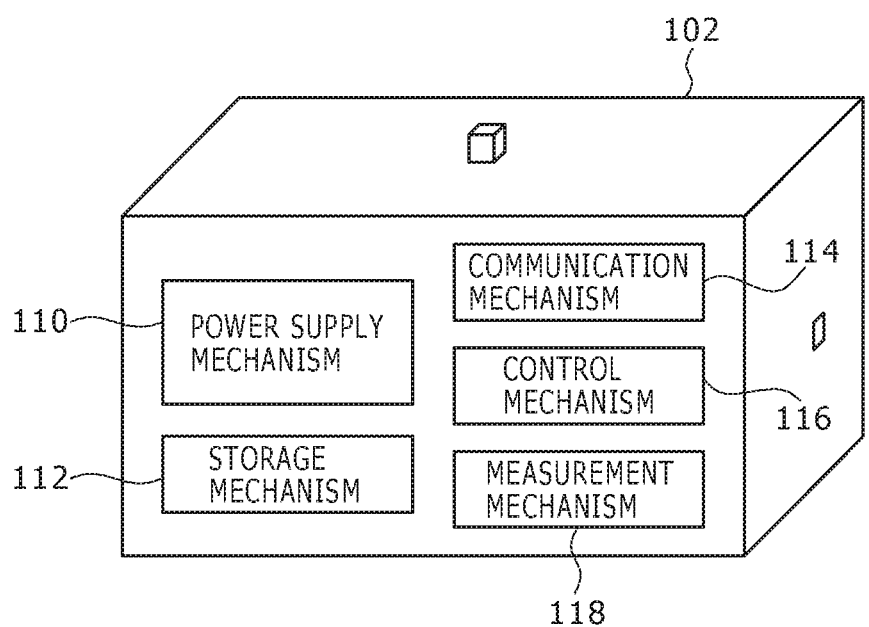
FIG. 6 is a diagram schematically illustrating an internal structure of a block in the present embodiment.

Referring to FIG. 6, there is schematically shown an internal structure of a block. As described above, there is no restriction on the shapes and the number of blocks; here, these blocks are generically shown as the block 102. The block 102 has a power supply mechanism 110, a storage mechanism 112, a communication mechanism 114, a control mechanism 116, and a measurement mechanism 118. The power supply mechanism 110 supplies power to the block 102 by a general technology such as getting power from a general-purpose buttery or a separately arranged power supply in a wired or wireless manner. The communication mechanism 114 establishes communication with the connected blocks via the joint position and, at the same time, establishes connection with the information processing apparatus 10 in a wired or wireless manner, thereby transmitting and receiving various signals therebetween. The storage mechanism 112 is a memory for storing identification information of the block 102 itself.

The control mechanism 116, realized by a microcomputer or the like, controls the communication mechanism 114 and the measurement mechanism 118. The measurement mechanism 118, realized by any one of a position sensor, an acceleration sensor, a gyro sensor, a geomagnetic sensor, and an angle sensor or a combination thereof, measures the position and tilt of the block 102. It should be noted that all the blocks need not have the structure shown. For example, the measurement mechanism 118 may be mounted on only a block or blocks of an assembled block set or may not be arranged at all in some cases. Also, with respect to the communication mechanism 114, the communication functions thereof with the information processing apparatus 10 may be arranged only on one block of a block set. Further, there may be a block that has none of the mechanisms shown. The structure of each block is determined in accordance with the contents of the processing to be executed by the information processing apparatus 10 or the accuracy to be required.

Figure 7:
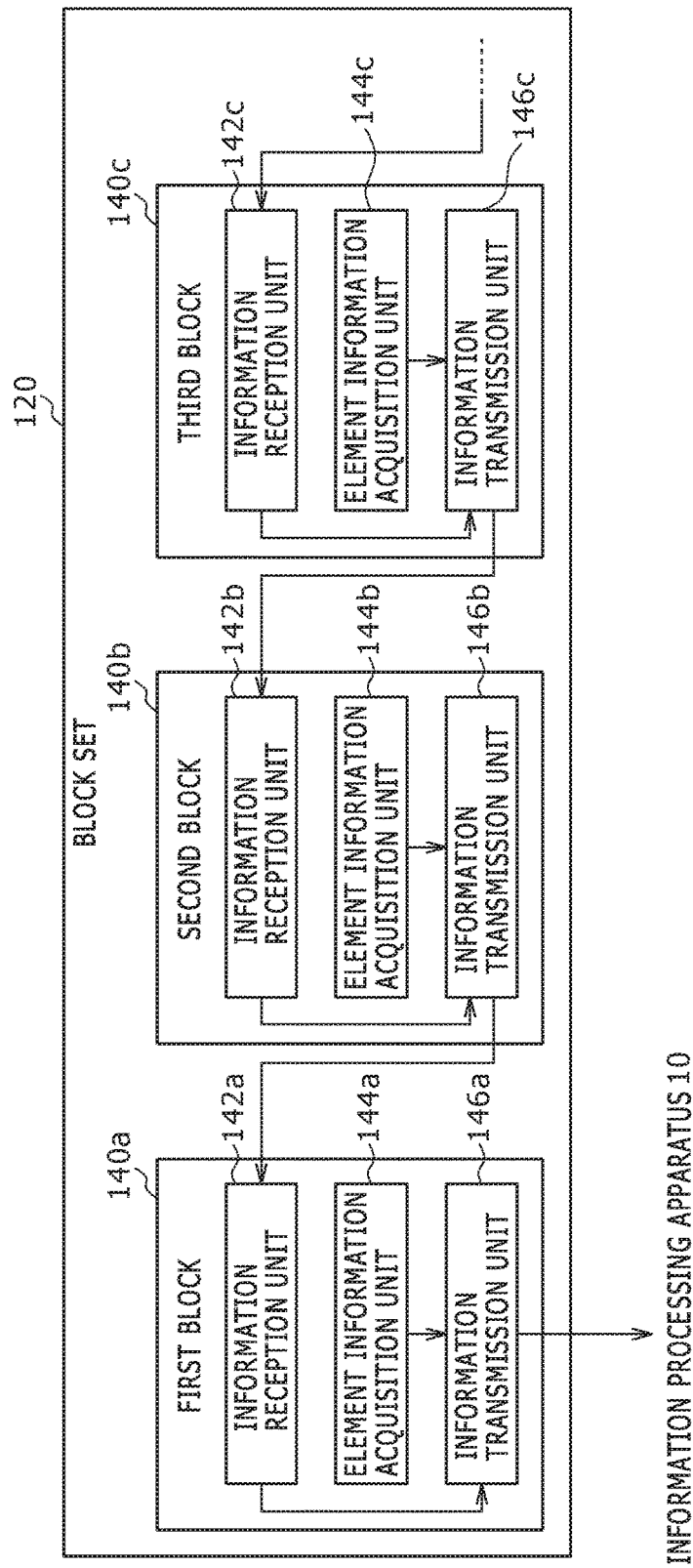
FIG. 7 is a diagram illustrating in detail a configuration of a block set with two or more blocks assembled in the present embodiment.

Referring to FIG. 7, there is shown in detail a configuration of a block set 120 with two or more blocks assembled. As described above, the block set 120 is formed by a user by assembling individual blocks. In FIG. 7, the blocks are a first block 140a, a second block 140b, a third block 140c, and so on. The first block 140a is a block that has the communication mechanism for communicating with the information processing apparatus 10. In order to prevent information congestion, basically only one block establishes communication with the information processing apparatus 10, of the blocks making up the block set 120. Therefore, the role of a hub is provided to the first block 140a. Then, information is transmitted from the blocks farther in connection relation from the first block 140a, the transmitted information being collected to the first block 140a as the information of the whole block set 120.

In what follows, in the connection of the blocks, a block relatively near the first block 140a is referred to as "upper" and a block relatively far from the first block 140a is referred to as "lower." A block that becomes the first block 140a may be determined to be one in advance or a switch not shown may be arranged on a block having a communication mechanism for communicating with the information processing apparatus 10, the switch being turned on by a user to make that block the first block 140a. Alternatively, a block that first established communication with the information processing apparatus 10 at the stage of assembly may be made the first block 140a.

When the user connects another block to the first block 140a thus determined, this block becomes the second block 140b. When still another block is connected to the second block 140b, this block becomes the third block 140c. It should be noted that the figure shows only three blocks; however, the number of blocks to be connected is not limited as described above, so that the configuration and the operation can be thought the same as those of one or four or more blocks.

The first block 140a, the second block 140b, and the third block 140c each have information reception units 142a, 142b, and 142c, element information acquisition units 144a, 144b, and 144c, and information transmission units 146a, 146b, and 146c. The information reception units 142a, 142b, and 142c receive the information transmitted from the directly connected lower blocks. Here, the information to be received includes the identification number of the block connected lower than the block concerned, the identification number of joint position, and the result of measurement by a built-in sensor. If two or more blocks are connected, the information superimposed every time blocks are passed starting from the lowest block.

The element information acquisition units 144a, 144b, and 144c each include the sensor built in the block concerned and a terminal arranged at a position for connecting another block and get sensor measurement results and information related with the position at which the lower block is connected. The information transmission units 146a, 146b, and 146c add the information acquired by the element information acquisition units 144a, 144b, and 144c of the block concerned to the information that includes the identification number of the lower block, the identification number of the joint position, and the result of the measurement by the built-in sensor received by the information reception units 142a, 142b, and 142c and transmit the resultant information to the directly connected upper block in the form of a signal. It should be noted however that the information transmission unit 146a of the first block 140a transmits the above-mentioned information to the information processing apparatus 10.

Figures 8, 9:
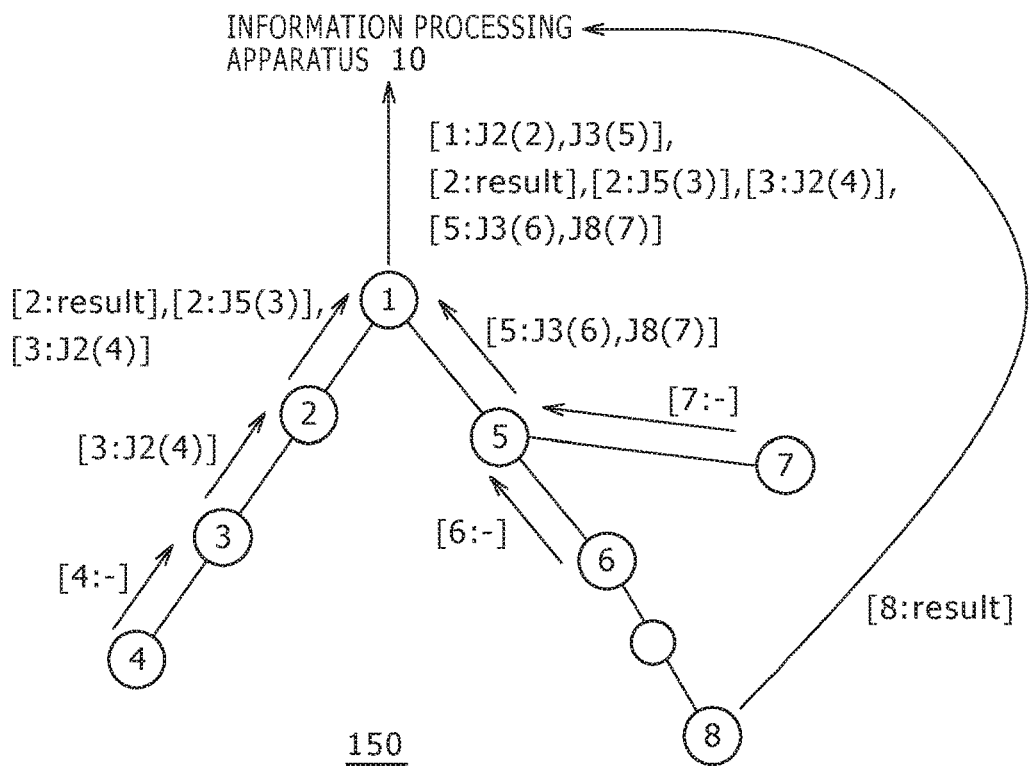
FIG. 8 is a diagram schematically illustrating one example of an information transmission route in the block set and information that is transmitted along the route in the present embodiment.
FIG. 9 is a diagram illustrating one example of a structure of data that is stored in a block information storage unit of the information processing apparatus in the present embodiment.

Referring to FIG. 8, there is schematically shown an example of an information transmission route in the block set 120 and the information that is transmitted along the route. In an information transmission route 150, each circle with a number written inside is representative of a block and the straight line between circles is representative of a state in which blocks are linked. The number in each circle also provides the identification number of each block. A block having an identification number "1" corresponds to the first block 140a shown in FIG. 7, establishing communication with the information processing apparatus 10. Blocks having identification numbers "2" and "3" shown in FIG. 8 are connected to the block having the identification number 1 in a series manner, so that the blocks having the identification numbers "2" and "3" correspond to the second block 140b and the third block 140c shown in FIG. 7, respectively.

On the other hand, it is possible that two or more blocks are linked to one block. In the example shown in FIG. 8, the block having the identification number "2" and a block having an identification number "5" are connected to the block having the identification number "1." To the block having the identification number "2," the block having the identification number "3" and a block having an identification number "4" are connected in a series manner as described above. To the block having the identification number "5," a block having an identification number "6" and a block having an identification number "7" are connected in a parallel manner. Further, in this example, to the block having the identification number "6," a block having no identification number is connected to which a block having an identification number "8" is connected. It should be noted that a block having no identification number means a block having none of the mechanisms shown in FIG. 6.

As described above, information is basically transmitted from a lower block to a higher block. In FIG. 8, the contents of the information to be transmitted are indicated along with arrows indicative of transmission directions. For example, the information to be transmitted from the block having the identification number "3" to the block having the identification number "2" is indicated as [3:J2(4)]. This is a signal configured by a format "own identification number: the identification number of a joint position arranged on the block (the identification number of the block connected there)," indicating that the block having the identification number "4" is connected to the position of an identification number "J2" of the joint positions of the block having the identification number "3." It should be noted however that the information format and contents are not restricted to those shown in the diagram.

The direction corresponding to the upper side of a block can be determined by the block having the role of the hub by searching for a network configured by the linking of the blocks, thereby executing sequencing or the like. Such a procedure may be realized by a networking technology in a device tree making up a general information processing system.

The block having the identification number "4" in FIG. 8 is located at the bottom of the joint series to which this block belongs, so that this block transmits information to the block having the identification number "3" one step higher. If no block is connected to the block having the identification number "4" and no sensor is built in this block, then the information to be transmitted is only the own identification number "4," so that the contents of transmission are represented by "[4:-]." Sign "-" denotes that there is neither sensor measurement result nor the connected block.

Receiving a signal from the identification number "4," the block having the identification number "3" relates the number of the terminal that received this signal and so on with the signal as the identification number of the joint position and then relates the own identification number "3" with this signal, thereby transmitting the related signal to the block having the identification number "2" one step higher. The transmission contents of this signal are [3:J2(4)] as described above. Likewise, the block having the identification number "2" generates a signal, namely, [2:J5(3)] in which the own identification number, the identification number of the joint position ("J5" in the example of the diagram), and the identification number "3" of the connected block are related with each other. In addition, if a sensor is built in the block having the identification number "2," then this block generates a signal in which a signal representative of the measurement result is related with the own identification number. In the example shown in the diagram, the measurement result is indicated as "result"; actually however, a specific numeric value is substituted in accordance with the type of the sensor.

The block having the identification number "2" transmits the data thus generated and the data transmitted from the lower block, namely, [3:J2(4)], to the block having the identification number "1" one step higher. It should be noted however that these signals may not always be transmitted at the same time; if the contents of a signal once transmitted are changed, only the changed information may be transmitted for example. On the other hand, if the blocks having the identification numbers "6" and "7" connected to the block having the identification number "5" have no sensor. Then, as with the block having the identification number "4," signals [6:-] and [7:-] are transmitted from these blocks to the block having the identification number "5." Another block is further connected to the block having the identification number "6"; however, it is assumed that this block has neither identification number nor communication mechanism, so that no information is obtained from that block.

The block having the identification number "5" generates a signal in which the identification number of the joint position and the identification number of the connected block are related with the own identification number and transmits this signal to the block having the identification number "1" one step higher. As shown in the diagram, if two or more blocks are connected, the connected blocks are collected to [5:J3(6), J8(7)] for example. Here, "J3" and "J8" are the identification numbers of the joint position at which the blocks having the identification numbers enclosed by parentheses are connected.

As described above, the pieces of information of the whole block set 120 are put together on the block having the identification number "1." Like the other blocks, the block having the identification number "1" generates a signal in which the identification number of the joint position and the identification number of the connected block is related with the own identification number. Then, the generated signal is transmitted to the information processing apparatus 10 along with the signal transmitted from the lower block. Consequently, the information processing apparatus 10 can sequentially acquire the identification numbers of the blocks making up the block set 120, the connection relation of each block, and the measurement results in the blocks in which sensors are built.

Thus, arranging only one block that plays the role of a hub and transmitting the collected information to the information processing apparatus 10 allow the prevention of information congestion and wasted communication processing. On the other hand, communication may be made from two or more blocks to the information processing apparatus 10 in some cases. For example, in the example shown in FIG. 8, the block having the identification number "8" is linked to the block having the identification number "6" via a block having no communication mechanism.

In this case, the block having the identification number "8" may directly transmit own data to the information processing apparatus 10. For example, if the block concerned has a position sensor, then this block transmits the own identification number and the measurement result thereof directly to the information processing apparatus 10, upon which the information processing apparatus 10 can grasp the existence of a block linked before the block having the identification number "6" and estimate the shape of the block concerned and the connection state thereof. Integration with the information obtained from the figure of an image taken by the camera 122 enhances the accuracy of position identification.

Making a block having no communication mechanism linkable by means of the above-mentioned configuration can increase the variation of the shapes after assembly without involving cost increase. It should be noted that, if the block having the identification number "8" is a block that has no communication mechanism for communication with the information processing apparatus 10, then a wait state is entered for waiting for the block having a communication mechanism for communication with the information processing apparatus 10 to be directly or indirectly linked. If the block mentioned above is linked, then transmitting a necessary signal with the direction to the linked block being "upper" causes the information collected on the block concerned to be transmitted to the information processing apparatus 10 along a route different from that of the identification number "1" as described above.

Referring to FIG. 9, there is shown an example of a structure of data to be stored in the block information storage unit 58 of the information processing apparatus 10. A block information table 160 has an identification number column 162, a shape column 164, a size column 166, and a joint position column 168. The identification number column 162 is written with an identification number to be allocated to each block making up a block tool. The shape column 164 is written with a type of the shape of each block, namely, "quadratic prism" or "cube" for example. The size column 166 is written with the width, depth and length of each block.

The joint position column 168 is written with the positional information of a joint position arranged on each block as related with the identification number thereof. In the example shown in FIG. 9, this column is written in a format "identification number of joint position (surface number and x coordinate and y coordinate within this surface)." A surface number is uniquely determined for each block surface in advance. For example, the block having the identification number "1" is a quadratic prism block of 4 cm in width, 4 cm in depth, and 8 cm in length. The joint position with the identification number being "J1" is located at the coordinate (2, 2) of the first surface. The joint position with the identification number being "J2" is located at the coordinate (1, 2) of the second surface. It should be noted that the format is not restricted to the above-mentioned format. Holding the information table described above in the information processing apparatus 10 allows the computation of the shape and the position of the block set 120 concerned on the basis of a signal transmitted from the block set 120.

Figure 10:
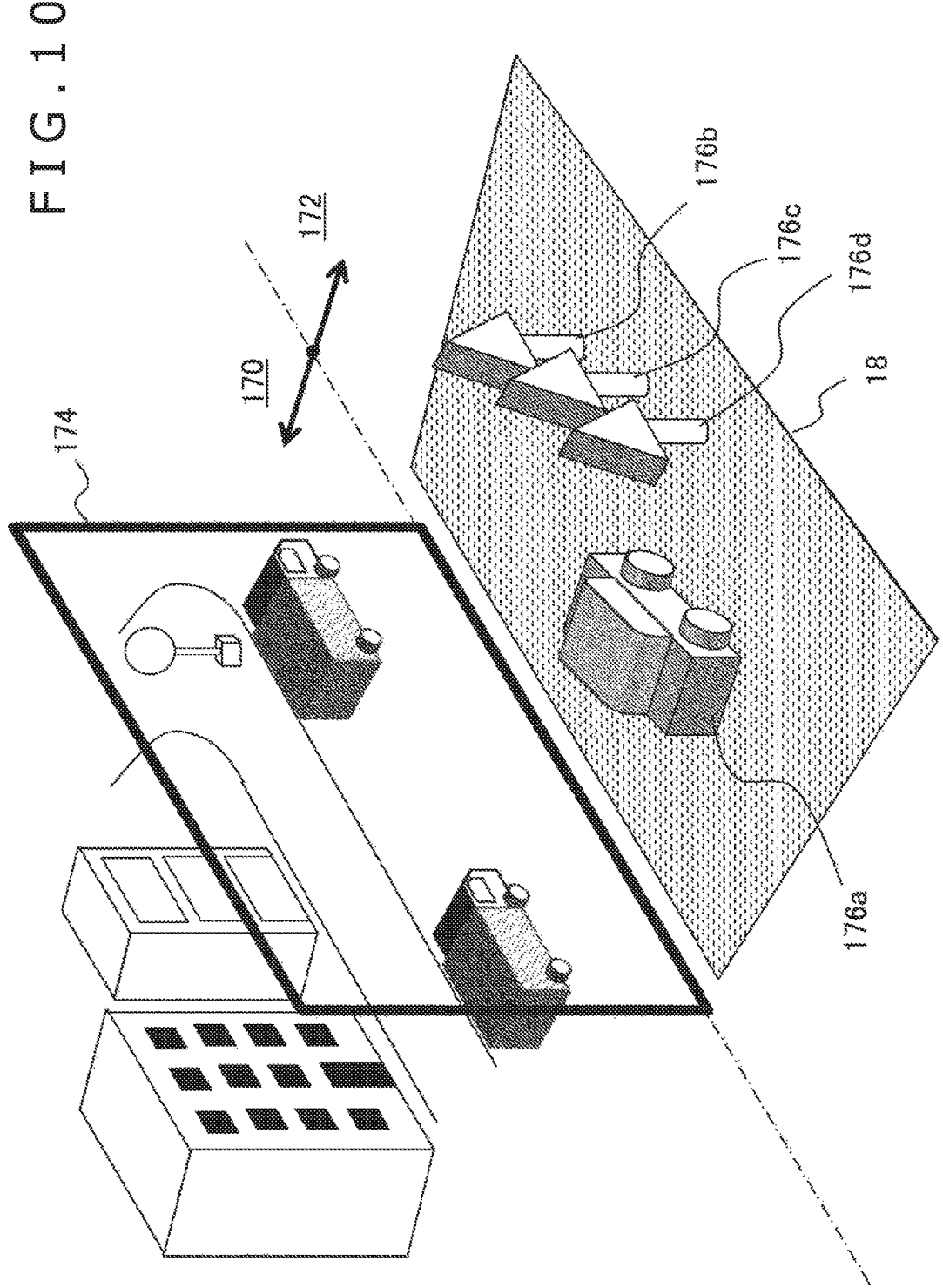
FIG. 10 is a diagram for explaining a mode of expressing the continuity between the real world and a displayed virtual world in the present embodiment.

The following describes display modes in the present embodiment. Referring to FIG. 10, there is shown a diagram illustrating modes for representing the continuity between the real world and a displayed virtual world. First, on the play field 18 of a real world 172, blocks 176a, 176b, 176c, and 176d are arranged. For the real world 172 such as this, a virtual world 170 is built such that the grounds thereof are connected to each other via a screen 174 of the display apparatus 16. Actually, the virtual world 170 is a concept on the data that is built in a virtual space in order to be displayed as an image on the screen 174.

In the example shown in the diagram, the virtual world 170 is a town that includes a road, buildings, and cars. The blocks 176a, 176b, 176c, and 176d that simulate a car and trees are arranged to provide a configuration in which there is the connection between a model town built in the real world 172 by the user and a road. Consequently, if the actual play field 18 is a narrow area, a state in which a further space extends into the screen 174 can be rendered. In accordance with the shapes and arrangements of the blocks 176a, 176b, 176c, and 176d, the direction of the road may be changed or the space itself represented by the virtual world 170 may be made a completely separate space. Also, rendering may be made such that the block 176a simulating a car moves in the opposite direction by shifting the virtual world 170 in parallel to the screen 174.

In a similar display mode, things in the real world 172 may be used to realize a game in which a play is made with a mate in the virtual world 170. For example, if the user performs an operation of fighting by manually moving a doll in the real world 172, then a fighting game is realized in which an enemy character existing in the virtual world 170 reacts or counter-attacks that operation of the user. In this case, each doll movement can be identified more accurately by use of the information transmitted from the block making up the doll in addition to the movement of the figure in a taken image. Displaying the real world 172 and the virtual world 170 as connected on the same ground allows the realization of a unique mode with presence in which a manner where a doll of the real world and an enemy character of the virtual world are fighting each other head-to-head can be seen by the user from desired angles.

Alternatively, a board game or a card game may be realized. In this case, a character of the mate is arranged in the virtual world 170 such that this character stands face-to-face with the user direly opposed to the screen 174 in the real world 172 and an object of game board is arranged in front of the mate character. Next, the chessman in the virtual world is moved following the movement of the chessman of the user in the real world 172 and the mate character also moves the chessman thereof accordingly. In the case of a game in which the chessmen or the cards do not cross between the user side and the mate side and the user and the mate move the chessmen or the cards in the limited areas in front of the user and the mate, the game field itself can be represented by the fusion of a real world and a virtual world with the area of the user side being a real world and the area of the mate side being a virtual world.

The virtual world 170 may all be created by the information processing apparatus 10 or may be the reflection of movements in a remote real world received by the information processing apparatus 10 via the network 8. Namely, the information processing apparatuses 10 at two positions making up similar information processing systems are interconnected by the network 8 and the movements of doll, chessman, or card by the mate user are reflected onto the movements of the enemy character, the mate chessman, and the card in the virtual world 170. The character and the mate's appearance itself in the virtual world 170 may be drawn by use of the object models selected and registered by the mate in advance.

Not only fighting games such as described above, but also the blocks of the real world 172 and the block of the virtual world 170 may be combined into one cube or one town. In this case, all movements in the virtual world may be determined by the information processing apparatus 10 or the movements of a person at a remote place may be reflected via the network 8 to realize a cooperative work.

The essential point in the display mode as described above is the line of sight of a user. In technologies where a game in a virtual world is played in accordance with user movements, the user may mainly look at the screen of the display apparatus, so that the same image may be displayed regardless of the place at which the user is. On the other hand, in the present embodiment, the user sees both the play field of the real world and the display image to interpret the continuity therebetween. Further, because blocks are assembled and moved, it is highly possible that the user moves around the play field 18. In consideration of these characteristics, it is desirable that the continuity between a real world and a virtual world is maintained when both the worlds are seen by the user from any position.

Figure 11:
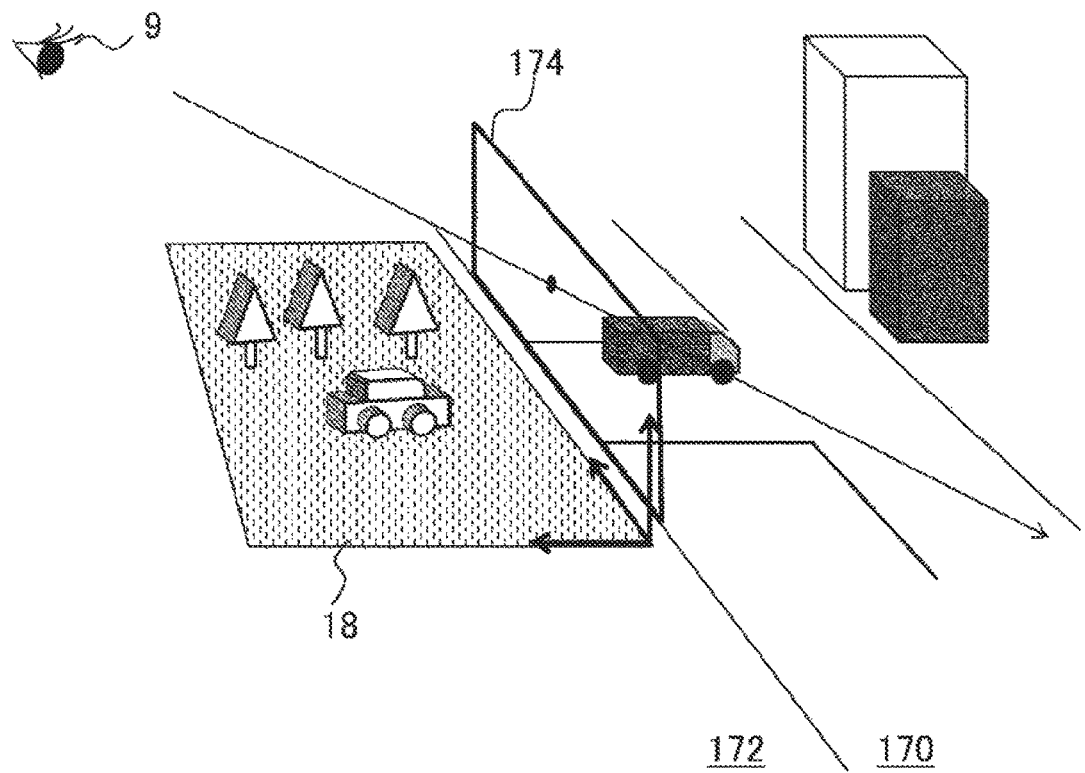
FIG. 11 is a diagram for explaining a technique of expressing the continuity between the real world and a displayed virtual world in the present embodiment.

Referring to FIG. 11, there is shown a diagram for explaining a technique of representing the continuity between a real world and a displayed virtual world. As described above with reference to FIG. 2, the figures of the play field 18 and the display apparatus 16 are extracted from an image taken by the camera 122 to acquire the positional coordinates of the play field 18 and the screen 174 in the world coordinate system. Next, in the virtual space defined in this world coordinate system, the virtual world 170 is built as opposed to the real world 172 with the screen 174 in between. Namely, the ground of the virtual world 170 is defined flush with the surface of the play field 18 of the real world 172 and, at the same time, objects are arranged in the virtual world 170 on the basis of the arrangement of blocks in the real world 172. It should be noted that the ground of the virtual world 170 may be tilted relative to the surface of the play field 18 of the real world 172 at a predetermined angle. Slightly tilting the ground of the virtual world 170 makes it easy to see states of the vicinity of the ground regardless of viewpoint while rendering the state of ground continuity.

In the virtual space built as described above, the viewpoint 9 is arranged at a position corresponding to the user viewpoint in the real space and the virtual world 170 is projected to the screen 174 on the basis of the virtual viewpoint 9. At this moment, as described above, the figure of the head of the user and the figure of the display apparatus are extracted from a taken image and, on the basis of the relative positions of these extracted figures, the position of the virtual viewpoint 9 relative to the screen 174 in the virtual space is determined. The figure of the head in a taken image can be detected by use of a general tracking technique. This configuration allows the movement of the virtual viewpoint 9 in accordance with the position of the actual head of the user and the linking between the user position and the display image.

It should be noted that a sensor for detecting the line of sight of user, such as an eye camera, has been proposed. By detecting the line of sight with such a sensor, the actual line of sight of user may be reflected onto the arrangement of the viewpoint 9 with higher accuracy. At this moment, a state in which the user is seeing (watching) a particular area in a concentrated manner may be detected to accordingly get the virtual viewpoint 9 nearer to a particular area, thereby zooming in the display image. The line of sight detection technique is also applicable to another display mode to be described later.

Figure 12:
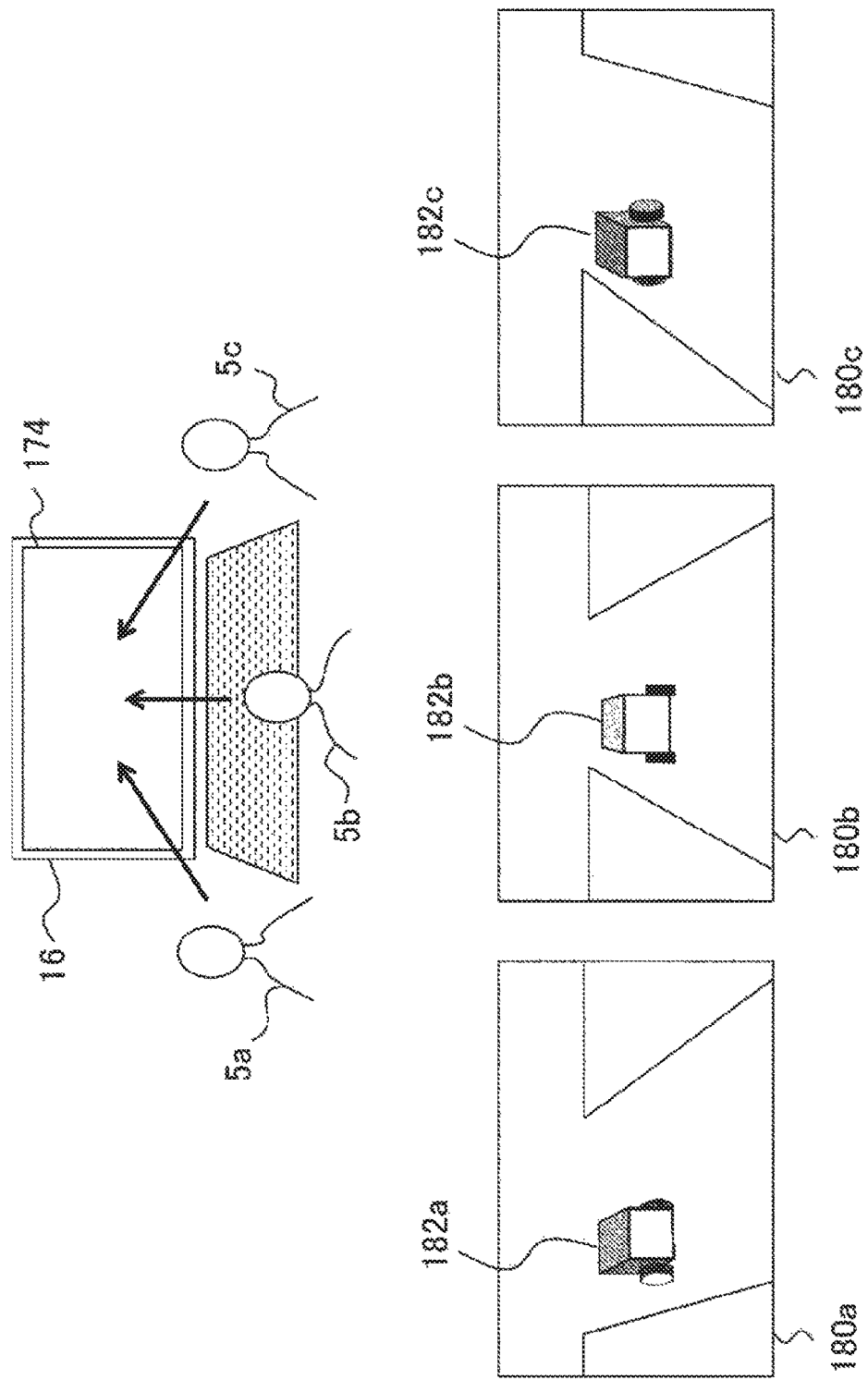
FIG. 12 is a diagram illustrating one example of changes in displayed images according to user positions in the present embodiment.

Referring to FIG. 12, there is shown an example of changes in a display image in accordance with the positions of a user. As shown in the upper part of the diagram, images to be displayed on the screen 174 are an image 180a, 180b, and 180c each obtained when users see the screen 174 from diagonal left (user 5a), from the front (user 5b), and from diagonal right (user 5c). In the diagram, each of the above-mentioned images is the projection of the virtual world 170 shown in FIG. 11 onto the plane of the screen 174; however, images are changed by changing virtual viewpoints in accordance with user positions. When the screen 174 is viewed from the diagonal left like the user 5a, the virtual world is also viewed from the diagonal left. Therefore, in the illustrated example, the left side of a car 182a in the virtual world is seen.

When the screen 174 is seen from the front like the user 5b, the virtual world also gets in a state seen from the front. Therefore, in the illustrated example, none of the sides of a car 182b in the virtual world can be seen. When the screen 174 is seen from the diagonal right like the user 5c, the virtual world also gets in a state seen from the diagonal right. Therefore, in the illustrated example, the right side of a car 182c in the virtual world is seen. In this setup, the virtual world changes in linkage with the change of viewing of the real world as the user moves, so that the continuity between a real world and a virtual world can be maintained with precision regardless of the user positions.

Figure 13:
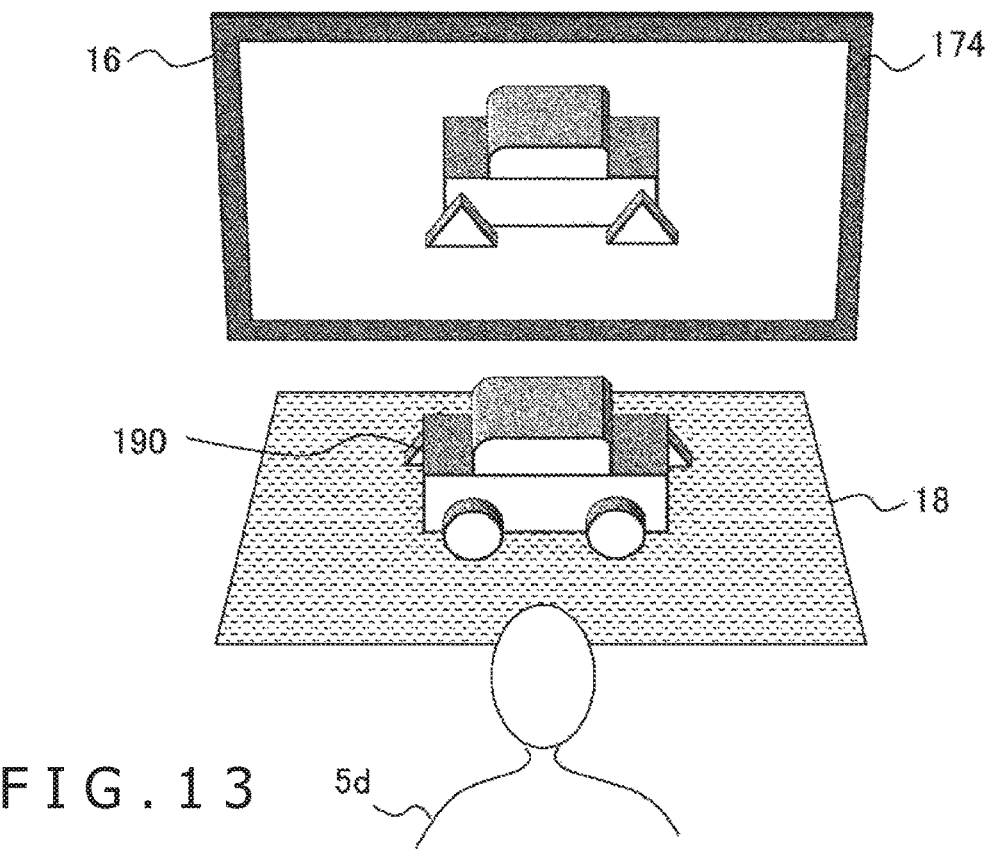
FIG. 13 is a diagram for explaining a mode of displaying an image with which a dead angle part of a block is recognizable in the present embodiment.

Referring to FIG. 13, there is shown a diagram for explaining, as another example of the display mode, a mode for displaying an image with which the dead angle part of a block is recognizable. First, a block set 190 already assembled or being assembled by a user is arranged on the play field 18 of the real world. When a user 5d sees the block set 190, the number of sides that can be seen at the time is limited as a matter of course; for example, the side opposite to the user cannot be seen. Therefore, the side in the dead angle part is displayed as an image. Namely, the screen 174 provides a mirror so as to display an image as if the block set 190 is reflected in the mirror. In the example shown in the diagram, it is seen from the display image that, of the block set 190 simulating a car, the wheels on the user side are circular, while the wheels opposite to the user are triangular.

Figure 14:
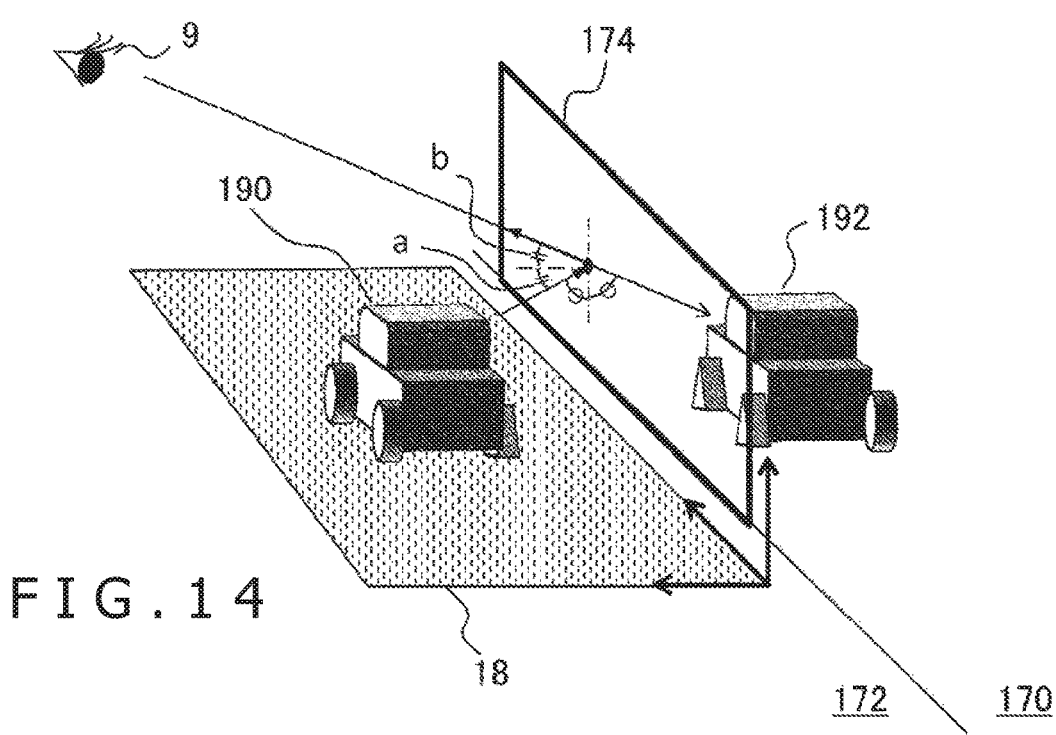
FIG. 14 is a diagram for explaining a technique of displaying an image with which a dead angle part of a block is recognizable in the present embodiment.

This setup allows the user 5d to make sure of a state of the side opposite to the user 5d and see the both sides at the time that cannot be normally seen at the time without touching the block set 190, thereby making the comparison or checking the balance in the car. Referring to FIG. 14, there is shown a diagram for explaining a technique of displaying an image with which the dead angle part of a block can be recognizable. In this case, it is possible that first a mirror image is obtained by a procedure similar to that described with reference to FIG. 2. Namely, the figures of the play field 18 and the display apparatus 16 are extracted from an image taken by the camera 122 so as to obtain the positional coordinates of the play field 18 and the screen 174 in the world coordinate system.

Next, from the positional relation between the play field 18 and the block set 190, the positional coordinate of the block set 190 is obtained and then this block set is replaced by a corresponding object model. In the block set 190, the dead angle part from the camera 122 is complemented by use the information transmitted from the block set 190 as described above. Consequently, an object model correctly representing the shape and the posture of a block set can be generated.

Then, an image in which this object model is seen from the side of the screen 174 is horizontally flipped, thereby obtaining a mirror image. This processing is the same as that an object model representing the block set 190 is arranged in plane symmetry with the screen 174 in a virtual space so as to generate the virtual world 170 and the generated virtual world 170 is projected to the screen 174 on the basis of the virtual viewpoint 9 placed on the side of the real world 172, as shown in FIG. 14. In this case, the virtual viewpoint 9 may be fixed. On the other hand, in order to display more mirror-like, the display may be changed in accordance with user viewpoints.

If the screen 174 is a mirror, then the image of the block set 190 is formed on a position at which an incident angle a and a reflection angle b coming from the block set 190 become equal as shown in FIG. 14. Depending on the position of the virtual viewpoint 9, the image formation position changes. Therefore, like the example shown in FIG. 11, the virtual viewpoint 9 is arranged at a position corresponding to the viewpoint of the user in the real world and, at the same time, an object model 192 is arranged in the virtual world 170 such that the corresponding part of the block set 190 is positioned on the extension line of the position at which the image of the block set 190 is formed as viewed from the virtual viewpoint 9 when the screen 174 serves as a mirror.

Next, by projecting the figure obtained when the object model 192 is viewed from the viewpoint 9 onto the screen 174, a mirror image is obtained. Thus, because the display image changes like the mirror as the user moves, the part to be moved and seen as with an actual mirror can be checked without feeling unnaturalness. Further, use of capabilities of freely controlling a virtual viewpoint that is actually a displayed image allows the user to see a part that is hard to see with an actual mirror. In this case, it is also practicable to arrange a mode in which the user can freely move the virtual viewpoint through the input apparatus 14.

Figure 15:
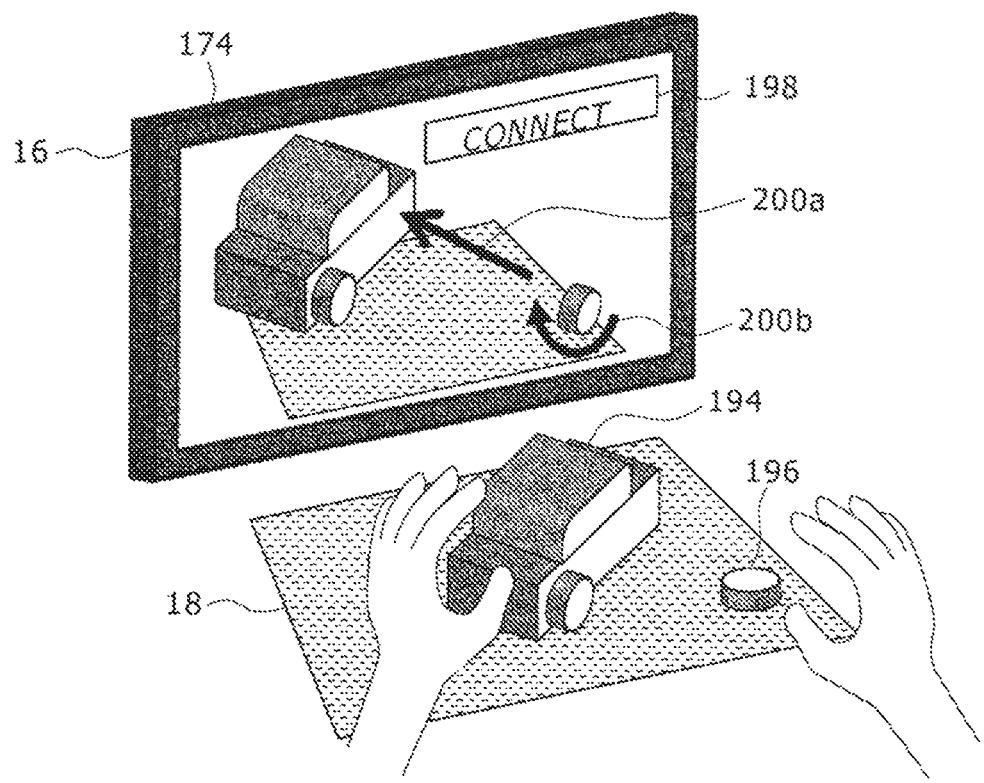
FIG. 15 is a diagram for explaining a mode of displaying an image with which a block assembling method is indicated to a user in the present embodiment.

Referring to FIG. 15, there is shown a diagram for explaining a mode of displaying an image with which a block assembling method is indicated to a user as another example of display modes. First, in the play field 18 in the real world, a block set 194 being assembled by a user and a block 196 before assembly are arranged. In the diagram, the block set 194 is indicative of a state in which a solid object to which a final shape is set is still being assembled. The block 196 is a block to be connected subsequently; there may be two or more blocks although only one is shown in the diagram.

Objects representative of the block set 194 and the block 196 are displayed on the screen 174 of the display apparatus 16 in the same arrangement as that in the real world as shown in the diagram. Further, the information about work to be executed next to complete the solid object is displayed as superimposed on arrows 200a and 200b, a character string 198, and so on. In this mode, on the basis of the information transmitted from the block, the information processing apparatus 10 identifies at which of the assembly steps the block set 194 stands. In the block information storage unit 58 of the information processing apparatus 10, the information related with a block to be connected next at each assembly step and the joint position thereof is stored in advance so as to be used to identify the information to be displayed in accordance with the progression of an actual work.

Next, in accordance with the positions of the block set 194 and the block 196 in the real world, the direction and the length of the arrows 200a and 200b necessary for explanation are determined and the position of the character string 198 is adjusted to be displayed. In the example shown in the diagram, the arrow 200b is indicative of the block 196 simulating a tier that is stood and connected and the arrow 200a is indicative of the connection of the block 196 to the block set 194 and the joint position thereof. In addition, specific contents of the work are indicated by the character string 198.

It should be noted that the connection of the block 196 in a standup state is also indicated by representing the block 196 lying in the real world by an object that stands in the virtual world. As with this mode, by reflecting the arrangement of blocks in the real world directly to the arrangement of objects in a virtual world so as to indicate block assembling methods, the assembly methods can be understood more easily without bothering to match the direction of the block set 194 with the drawing or search for the block 196 to be connected, as compared with the use of routine instruction manuals such as print materials or home pages.

It should be noted that the means of indicating the assembling methods is not limited to that shown in the diagram. For example, methods may be used in which a moving image for getting an object indicative of the block 196 near to the joint position of a block set 200 is displayed or the block 196 to be connected next is highlighted so as to show easy distinction from other blocks. In addition, a voice guide may be outputted.

Figure 16:
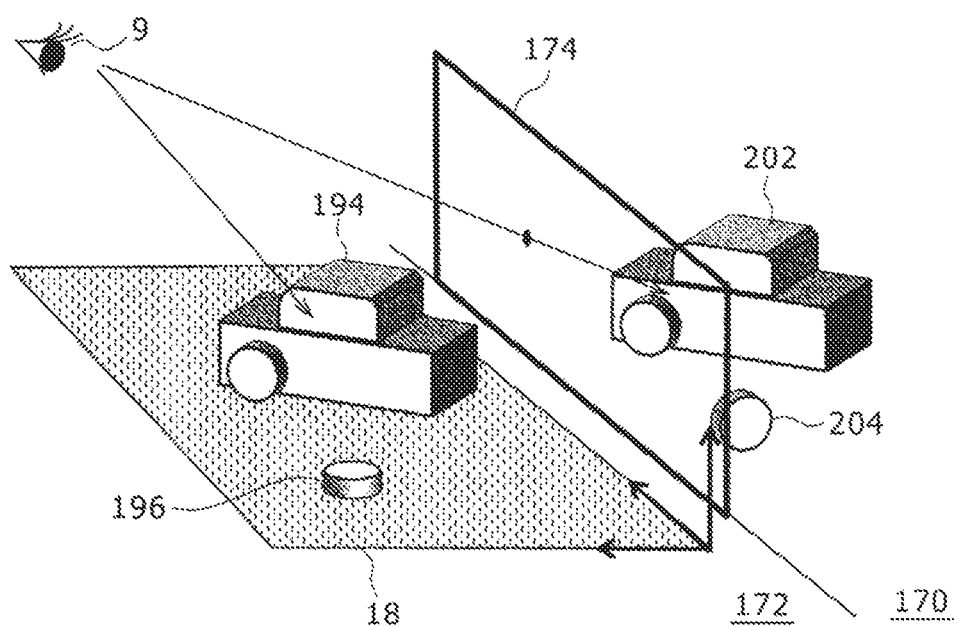
FIG. 16 is a diagram for explaining a technique of displaying an image with which a block assembling method is indicated to a user in the present embodiment.

Referring to FIG. 16, there is shown a diagram for explaining a technique of displaying an image with which a block assembling method is indicated to a user. In this example too, the figures of the play field 18 and the display apparatus 16 are extracted from an image taken by the camera 122 so as to obtain the positional coordinates of the play field 18 and the screen 174 in the world coordinate system like the modes described above. Then, from the positional relation between the play field 18, the block set 194, and the block 196, the positional coordinates thereof in the world coordinate system are obtained. Next, with the arrangements of these block set 194 and block 196 in the real world 172 directly translated to the virtual world 170, object models 202 and 204 indicative thereof are arranged.

At this moment, as with the object model 204, the direction may be changed from the actual block 196 as required so as to indicate the correct connection direction. Then, the virtual viewpoint 9 is placed at a position corresponding to the viewpoint of the user in the real space so as to project the virtual world 170 to the screen 174. This setup allows the displaying of objects in the same arrangement as the arrangement of the block set 194 and the block 196 seen from the position of the user wherever the user is, thereby maintaining the understandability of the displayed information. This feature is especially effective when a solid object is large in size or complicated in structure.

Figure 17:
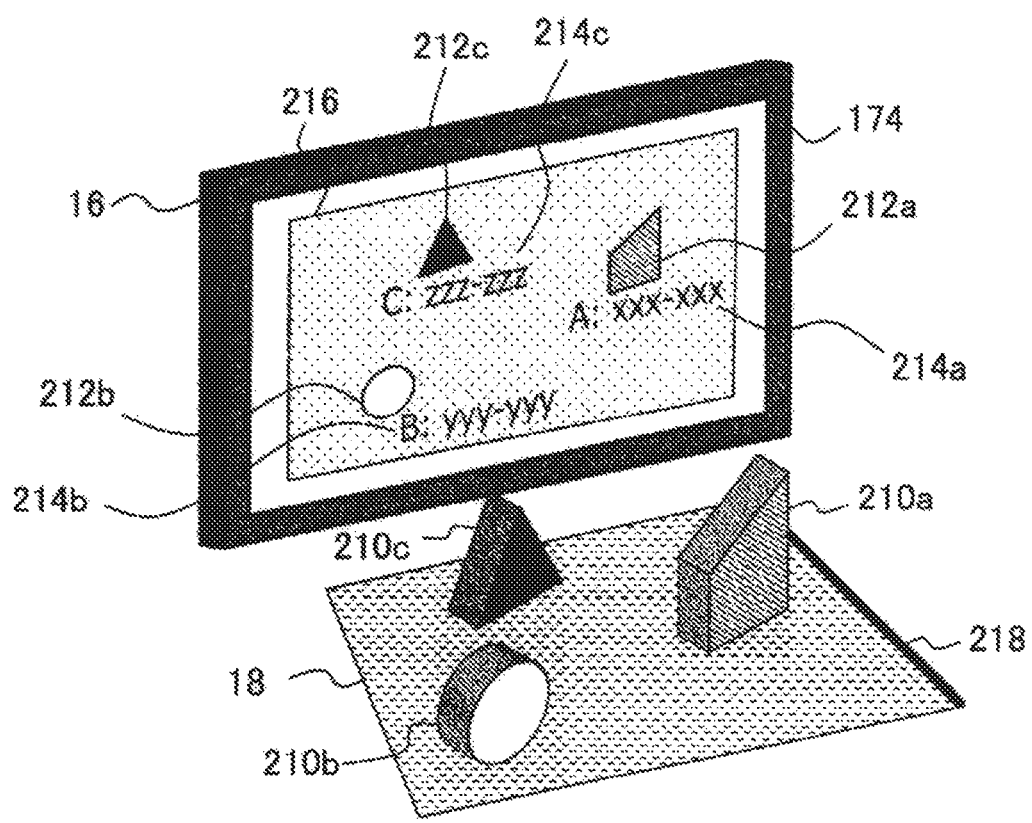
FIG. 17 is a diagram for explaining a mode of showing information sorted by making a block abstract in the present embodiment.

In the modes described so far, the image representation of higher presence is realized by building a virtual world in which 3D (three-dimensional) objects are arranged. Conversely, it is possible to make understanding easier and capture many items of information by simplifying or abstracting display. Referring to FIG. 17, there is shown a diagram for explaining a mode of showing information sorted by making a block abstract. First, blocks 210a, 210b, and 210c are put on the play field 18 of the real world. For this arrangement, a display image on the screen 174 indicates the positions of these blocks with the play field 18 overlooked from top by arranging graphics 212a, 212b, and 212c obtained by abstracting above-mentioned blocks by side shapes.

In addition, below each graphics, the information related therewith is represented by character strings 214a, 214b, and 214c. This setup allows displaying of the block positions and, at the same time, many items of the information accompanied therewith. In this case too, the figures of the play field 18 and the display apparatus 16 are extracted from an image taken by the camera 122 and, from the positional relation between the play field 18 and the blocks 210a, 210b, and 210c, the positional coordinates of the play field 18, the screen 174, and the blocks 210a, 210b, and 210c in the world coordinate system are obtained. Then, a virtual viewpoint is placed at a predetermined height directly above the center of the play field 18.

The information about the graphics obtained by abstracting the blocks and the additional information to be displayed are stored in the block information storage unit 58 in advance along with the identification information of each block. Then, the identification information of the blocks 210a, 210b, and 210c is identified by the information transmitted from the taken image or the blocks and the graphics corresponding to these blocks are read. Next, the read graphics and the corresponding additional information are displayed at the positions of the blocks seen from the virtual viewpoint. In this mode, the up and down direction of a play field 216 on the display is determined by the position of the display apparatus 16 relative to the play field 18 in the real world.

To be more specific, the play field 216 is displayed such that a side of the play field 18 in the real world that faces the display apparatus 16 is placed in the upper side of the screen 174. Therefore, if the display apparatus 16 is placed in parallel to a side 218 of the play field 18 for example, the arrangement of the play field 216 and the graphics is rotated by 90 degrees counterclockwise so that this side 218 comes in the upper side on the display. This setup allows easy understanding of the correspondence between the arrangement of the blocks in the real world and the arrangement on display.

However, if the screen 174 is placed flush with the play field 18 on a tablet terminal for example, then it is assumed that the up and down direction of the play field 216 on display be the same as the up and down direction of the play field 18 in the real world wherever the display apparatus 16 is located. In this case, if the display apparatus 16 rotates around the axis vertical to the screen 174, the play field 216 on display is rotated in the opposite direction. Such a display mode may be used to display the situation of a game using blocks in the real world in an easily understandable manner and display rules and instruction manuals.

Figure 18:
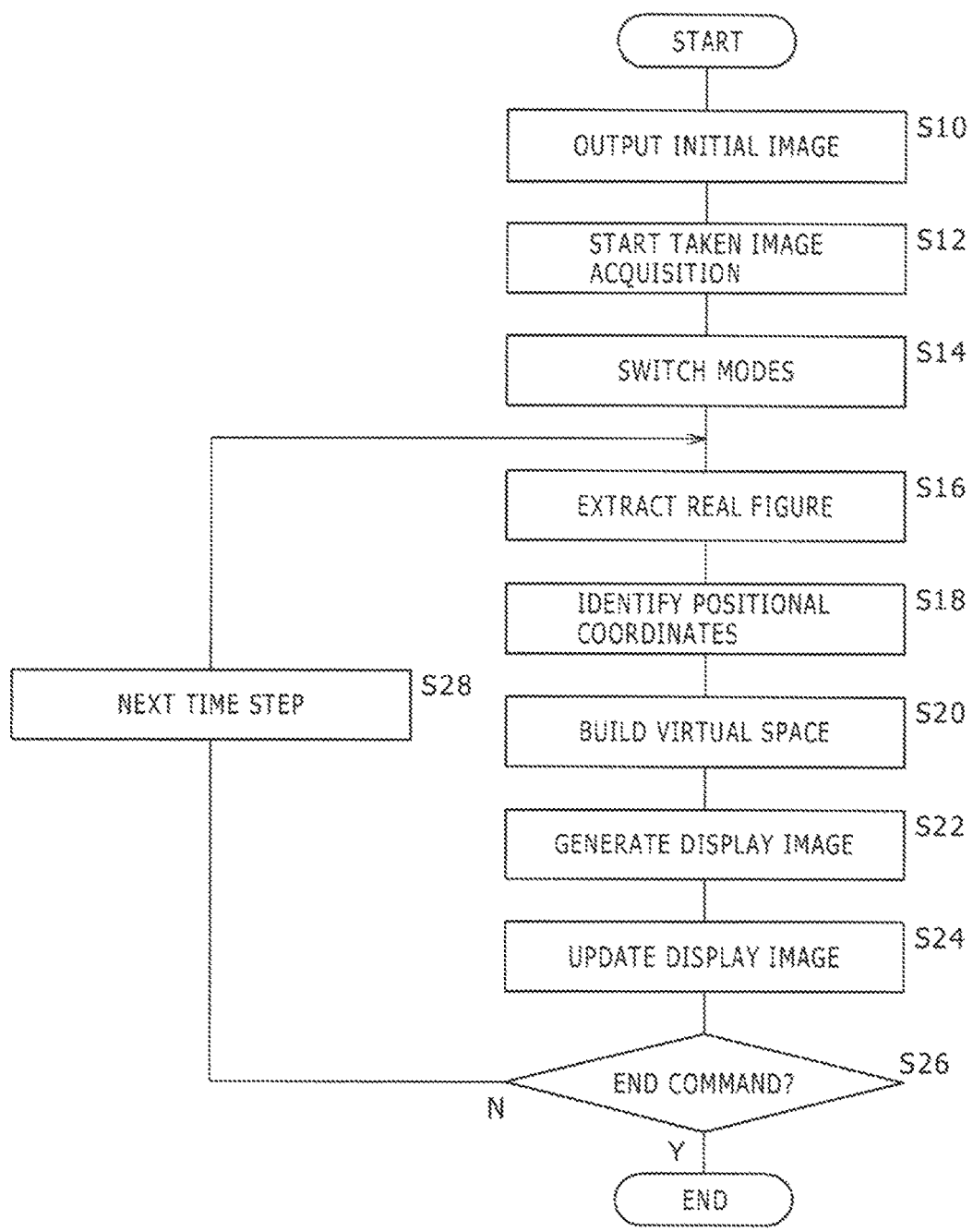
FIG. 18 is a flowchart indicative of a processing procedure for the information processing apparatus in the present embodiment to execute image display with a real space situation reflected.

The following describes the operations of the information processing apparatus 10 that can be realized by the configurations described so far. Referring to FIG. 18, there is shown a flowchart indicative of a processing procedure for the information processing apparatus 10 to execute image display with a real space situation reflected. First, when the input for starting up the information processing apparatus 10 and selecting a corresponding application is executed by a user through the input apparatus 14, an initial image is outputted to the display apparatus 16 by the cooperative action between the information processing unit 60 and the display image generation unit 64 of the information processing apparatus 10 (S10).

On the other hand, the taken image acquisition unit 52 causes the camera 122 to start imaging, thereby starting the acquisition of the image data (S12). Subsequently, the taken image acquisition unit 52 acquires the data of taken images at a predetermined rate. The timing with which taken images are acquired is referred to as time step. Next, the information processing unit 60 switches between the settings of virtual world and viewpoint in accordance with a function selected by the user via the input apparatus 14 (S14). A function may be an option for determining whether to draw a virtual world connected with a real world by ground as shown in FIG. 10, whether to mirror a real world as shown in FIG. 13, whether to display an assembling method as shown in FIG. 15, or whether to display other information along with abstracted graphics as shown in FIG. 17; this function may be uniquely determined depending on an application to be executed, such as a selected game or may be switched by a function provided by an application being executed.

The correspondence between a selected function and a virtual space to be built is stored in the space generation information storage unit 62. Next, the real space analysis unit 56 extracts the figures of the display apparatus 16, the play field 18, the user 5, and the blocks on the play field 18 from an image acquired by the taken image acquisition unit 52 (S16). Then, the real space analysis unit 56 sets a world coordinate system with one angle of the play field set to the origin for example and acquires positional coordinates in each real world coordinate system (S18).

At this moment, by acquiring the information related with block connection states from the block set 120 as required, the positional information of blocks acquired from the figures in a taken image is complemented. Consequently, the state of a block in the dead angle as seen from the camera can also be identified. If at least one of the figures of blocks in a taken image is determined to correspond to which of the blocks in a block set, following the connection relation with the positional coordinate of the block concerned being the origin makes the positional coordinates of all blocks known. For this purpose, a marker may be attached to one block or a block itself may be made emit light, for example, thereby easily identifying the block that is the origin.

It should be noted however that, in the case where the positions of all blocks are known only with the figures of a taken image such as a mode in which pre-molded blocks are used discreetly or a mode in which the number of blocks may be small, the transmission of information from blocks may not be executed. Next, the information processing unit 60 builds a virtual space in accordance with the function selected by the user (S20). To be more specific, necessary objects are arranged in accordance with the positions of the play field 18, the screen of the display apparatus 16, the user 5, and blocks in the real world and then a virtual viewpoint is determined. Which object is to be arranged at which position and whether or not to make the virtual viewpoint correspond to the actual user viewpoint are determined in accordance with the mode determined in S14.

Next, the display image generation unit 64 generates a display image by projecting an object in the virtual space as seen from a virtual viewpoint to a projection surface set by predetermined rules (S22). In many cases, the projection surface is the screen of the display apparatus 16; in the case shown in FIG. 17 however, the projection surface is set at a predetermined position seen from a virtual viewpoint. Then, the data of this display image is outputted to the display apparatus 16 so as to update the display image (S24). If an input for ending the processing is not executed by the user (N of S26), the processing steps from S16 to S24 are repeated with a taken image obtained in the next time step being the target of the processing (S28 and S16 through S24). It should be noted that, if, for the movements of the blocks and the user, the change in the positional coordinates thereof is interpolated, the processing of analyzing the taken image of S16 and S18 so as to obtain the positional coordinates may be executed at rates lower than the virtual space construction in S20, the display image generation in S22 and S24, and update processing.

The procedure described above allows the continuation of displaying the image that is changed in accordance with the change of blocks due to movement and assembly and is changed to reflect the movement of the user. If an input is executed by the user so as to end the processing, the overall processing is ended (Y of S26). It should be noted that, in the above description, the change of a display image for the horizontal movement of the user is mainly shown; however, the change due to the movement of a virtual viewpoint in accordance with an actual viewpoint is applicable to any directions including the vertical movement of viewpoint.

For example, changing also the height of a virtual viewpoint from a virtual space in accordance with the height of the head of the user can properly display the blocks on the play field of a layer seen by the user even if the play field is provided with steps or the play field is multiple-layered. In addition, accepting a user operation for getting a virtual viewpoint near to or far from a block through the input apparatus 14 allows the creation of a state on the display in which blocks are seen close or remote even if the user does not actually move. As described above, it is also practicable to detect whether the user watch a predetermined area by use of an eye camera so as to accordingly get a virtual viewpoint close or remote relative to a target area.

According to the present embodiment described above, the positional relation between a play field on which blocks are placed, a display apparatus, and a user is identified from a taken image so as to build a virtual space on the basis of the identified positional relation. Next, a virtual viewpoint for seeing objects arranged in the virtual space concerned is set on the basis of the actual user position. Consequently, a display image changes in cooperation with the viewpoint with which the user sees the blocks and the display image. As a result, the manner in which the real world including blocks and the virtual world in the display image are seen moves in cooperation with the movement of the user, thereby realizing the image representation of presence and variety.

Further, integrating the information transmitted from blocks with the information obtained from a taken image allows the identification of actual block states with precision. Especially, a state of parts in the dead angle of the user or the camera can also be recognized and the recognized state can be reflected on a display image, so that the part that otherwise cannot be originally seen can be seen without moving an assembled block set for example. In addition, further integrating the information about each block and assembling methods for a state of identified blocks allows the execution of various kinds of information display in formats corresponding to the state of blocks in the real world and the positions of the user.

The present invention has been described on the basis of an embodiment. It is to be understood by those skilled in the art that the present embodiment is illustrative, that the combination of components and processes can be modified in various ways, and that such modification examples also fall within the scope of the present invention.

REFERENCE SIGNS LIST

1 . . . Information processing system, 3*a* . . . Block, 10 . . . Information processing apparatus, 14 . . . Input apparatus, 16 . . . Display apparatus, 22 . . . CPU, 24 . . . GPU, 26 . . . Main memory, 50 . . . Block information reception unit, 52 . . . Taken image acquisition unit, 54 . . . Input information acquisition unit, 56 . . . Real space analysis unit, 58 . . . Block information storage unit, 60 . . . Information processing unit, 62 . . . Space generation information storage unit, 64 . . . Display image generation unit, 66 . . . Model information storage unit, 102 . . . block, 110 . . . Power supply mechanism, 112 . . . Storage mechanism, 114 . . . Communication mechanism, 116 . . . Control mechanism, 118 . . . Measurement mechanism, 120 . . . Block set, 140*a* . . . First block, 142*a* . . . Information reception unit, 144*a* . . . Element information acquisition unit, 146*a* . . . Information transmission unit.

INDUSTRIAL APPLICABILITY

As described above, the present invention is applicable to an information processing apparatus, a content display apparatus, a game apparatus, an assembly-type apparatus, and education tools, for example.

The invention claimed is:

1. An information processing apparatus comprising:
a real space analysis unit configured to sequentially identify, from an image of a real space taken by a camera, a positional relation between a display apparatus, a real surface in front of a flat screen of the display apparatus, a real body on the real surface to be handled by a user, and the user;

an information processing unit configured to: (i) arrange a virtual surface corresponding to the real surface and a virtual object corresponding to the real body in a virtual space created on the basis of the positional relation between the display apparatus and the real surface, and (ii) set a virtual viewpoint for the virtual surface and the virtual object by changing the virtual viewpoint in accordance with a movement of the user in all three dimensions of the real space, including laterally leftward and rightward with respect to a center of the flat screen; and a display image generation unit configured to generate a display image by drawing the virtual surface and the virtual object seen from the virtual viewpoint and output the generated display image to the display apparatus for display on the flat screen, wherein:

the flat screen includes only a single, planar display surface and the display image is displayed on the single planar display surface, the real surface defines a first plane in the real space and the flat screen of the display apparatus defines a second plane in the real space, where the first and second planes are orthogonal to one another, the display image is generated in such a way that the virtual surface and the virtual object in the virtual space maintain visual continuity with the real surface and the real body in the real space, and the identification of the positional relation, the arrangement of the virtual surface, the arrangement of the virtual object, the setting of the virtual viewpoint in accordance with the movement of the user in all three dimensions of the real space, and the output of the display image such that the virtual surface and the virtual object in the virtual space maintain visual continuity with the real surface and the real body in the real space, are repeated a plurality of times per second such that real-time changes in the appearance of the virtual surface and the virtual object appear on the flat screen as the user moves in all three dimensions of the real space, including laterally leftward and rightward with respect to a center of the flat screen.

2. The information processing apparatus according to claim 1, wherein, in the virtual space, the information processing unit generates a virtual world with an object arranged continually flush with the surface in a real world in continuation to the real space and maintains continuity between the real space and the virtual space regardless of a position of the user by moving the virtual viewpoint as corresponding to a movement of the user.

3. The information processing apparatus according to claim 2, wherein the information processing unit reflects a movement of another real body handled by one of another user and the user obtained by another information processing apparatus connected via a network onto a movement of an object in the virtual world.

4. The information processing apparatus according to claim 1, wherein the information processing unit identifies a position of the real body on the real surface on the basis of the image taken by the camera and identifies a shape of the real body on the basis of identification information of the real body and information related with connection relation transmitted from the real body so as to arrange an object representative of the real body in the virtual space and move the virtual viewpoint so as to follow a movement of the user, thereby providing a cooperative action between viewing of the real body in a real world and viewing of the virtual object on the display apparatus.

5. The information processing apparatus according to claim 4, wherein the information processing unit arranges the virtual object representative of the real body in a plane of symmetry manner with the real space relative to the screen of the display apparatus, and the display image generation unit generates an image of a state in which the real body is reflected in a mirror.

6. The information processing apparatus according to claim 4, wherein, when the screen of the display apparatus is supposed to be a mirror, the information processing unit identifies a position at which the virtual object representing the real body is formed on the basis of a position of the virtual viewpoint and determines a position of the object in the virtual space in accordance with the position of the virtual viewpoint such that the virtual object is drawn at the positon of image forming.

7. The information processing apparatus according to claim 4, wherein the information processing unit arranges virtual objects representative of the real body and a part in substantially the same arrangement as that of the real body and the part being assembled in the real space and acquires information related with a next assembling step, and the display image generation unit generates an image with the information related with the assembling step superimposed at a position adjusted by the arrangement of the real body and the part.

8. The information processing apparatus according to claim 1, wherein the information processing apparatus switches between a mode of setting the virtual viewpoint in accordance with a movement of the user and another mode by one of a function to be executed and a selective input by the user.

9. An information processing method to be executed by an information processing apparatus, the method comprising:

acquiring a taken image from a camera;

sequentially identifying, from an image of a real space taken by a camera, a positional relation between a display apparatus, a real surface in front of a flat screen of the display apparatus, a real body on the real surface to be handled by a user, and the user;

arranging a virtual surface corresponding to the real surface and a virtual object corresponding to the real body in a virtual space created on the basis of the positional relation between the display apparatus and the real surface in accordance with rules read from a memory, and setting a virtual viewpoint for the virtual surface and the virtual object by changing the virtual viewpoint in accordance with a movement of the user in all three dimensions of the real space, including laterally leftward and rightward with respect to a center of the flat screen; and generating a display image by drawing the virtual surface and the virtual object seen from the virtual viewpoint and output the generated display image to the display apparatus for display on the flat screen, wherein:

the flat screen includes only a single, planar display surface and the display image is displayed on the single planar display surface, the real surface defines a first plane in the real space and the flat screen of the display apparatus defines a second plane in the real space, where the first and second planes are orthogonal to one another, the display image is generated in such a way that the virtual surface and the virtual object in the virtual space maintain visual continuity with the real surface and the real body in the real space, and the identification of the positional relation, the arrangement of the virtual surface, the arrangement of the virtual object, the setting of the virtual viewpoint in accordance with the movement of the user in all three dimensions of the real space, and the output of the display image such that the virtual surface and the virtual object in the virtual space maintain visual continuity with the real surface and the real body in the real space, are repeated a plurality of times per second such that real-time changes in the appearance of the virtual surface and the virtual object appear on the flat screen as the user moves in all three dimensions of the real space, including laterally leftward and rightward with respect to a center of the flat screen.

10. A non-transitory, computer readable storage medium containing a computer program, which when executed by a computer, causes the computer to carry out actions, comprising:

acquiring a taken image from a camera;

sequentially identifying, from an image of a real space taken by a camera, a positional relation between a display apparatus, a real surface in front of a flat screen of the display apparatus, a real body on the real surface to be handled by a user, and the user;

arranging a virtual surface corresponding to the real surface and a virtual object corresponding to the real body in a virtual space created on the basis of the positional relation between the display apparatus and the real surface in accordance with rules read from a memory, and setting a virtual viewpoint for the virtual surface and the virtual object by changing the virtual viewpoint in accordance with a movement of the user in all three dimensions of the real space, including laterally leftward and rightward with respect to a center of the flat screen; and generating a display image by drawing the virtual surface and the virtual object seen from the virtual viewpoint and output the generated display image to the display apparatus for display on the flat screen, wherein:

the flat screen includes only a single, planar display surface and the display image is displayed on the single planar display surface, the real surface defines a first plane in the real space and the flat screen of the display apparatus defines a second plane in the real space, where the first and second planes are orthogonal to one another, the display image is generated in such a way that the virtual surface and the virtual object in the virtual space maintain visual continuity with the real surface and the real body in the real space, and the identification of the positional relation, the arrangement of the virtual surface, the arrangement of the virtual object, the setting of the virtual viewpoint in accordance with the movement of the user in all three dimensions of the real space, and the output of the display image such that the virtual surface and the virtual object in the virtual space maintain visual continuity with the real surface and the real body in the real space, are repeated a plurality of times per second such that real-time changes in the appearance of the virtual surface and the virtual object appear on the flat screen as the user moves in all three dimensions of the real space, including laterally leftward and rightward with respect to a center of the flat screen.

\* \* \* \* \*